United States Patent
Nagarajan et al.

(10) Patent No.: US 11,243,076 B2
(45) Date of Patent: Feb. 8, 2022

(54) SYSTEMS AND METHODS FOR EXTENDING THE SPATIAL COVERAGE OF A REFERENCE PRESSURE NETWORK

(71) Applicant: NextNav, LLC, Sunnyvale, CA (US)

(72) Inventors: Badrinath Nagarajan, Cupertino, CA (US); Guiyuan Han, San Jose, CA (US); Michael Dormody, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 315 days.

(21) Appl. No.: 16/380,120

(22) Filed: Apr. 10, 2019

(65) Prior Publication Data
US 2020/0072606 A1 Mar. 5, 2020

Related U.S. Application Data

(60) Provisional application No. 62/725,730, filed on Aug. 31, 2018.

(51) Int. Cl.
*G01C 5/06* (2006.01)
*G01C 21/20* (2006.01)

(52) U.S. Cl.
CPC ............. *G01C 5/06* (2013.01); *G01C 21/206* (2013.01)

(58) Field of Classification Search
CPC ................................. G01C 5/06; G01C 21/206
See application file for complete search history.

(56) References Cited

U.S. PATENT DOCUMENTS

| 8,130,141 | B2 | 3/2012 | Pattabiraman et al. |
| 9,057,606 | B2 | 6/2015 | Wolf et al. |
| 9,980,246 | B2 | 5/2018 | Pattabiraman et al. |
| 10,477,358 | B1 | 11/2019 | Dormody |

(Continued)

OTHER PUBLICATIONS

Moffat et al., "Comprehensive comparison of gap-filling techniques for eddy covariance net carbon fluxes", Agricultural and Forest Meteorology, vol. 147, Issues 3-4, Dec. 10, 2007, pp. 209-232.

(Continued)

*Primary Examiner* — Tarun Sinha
*Assistant Examiner* — Lal C Mang
(74) *Attorney, Agent, or Firm* — MLO, a professional corp.

(57) ABSTRACT

Extending the spatial coverage of a reference pressure network. Particular embodiments described herein include machines that initially determine that an estimated position of a mobile device resides outside a coverage area of a network of reference pressure sensors. Reference-level pressures corresponding to reference pressure sensors of the network are determined using measurements of pressure from the network of reference pressure sensors. A pressure pattern for a region that includes the estimated position and an area not included in the coverage area of the network is determined using reference-level pressures that were not determined using measurements of pressure from the network of reference pressure sensors. The reference-level pressures corresponding to reference pressure sensors of the network and the pressure pattern are used to determine a reference-level pressure value for use in calibrating a pressure sensor of the mobile device or for use in estimating an altitude of the mobile device.

7 Claims, 19 Drawing Sheets

(56) References Cited

U.S. PATENT DOCUMENTS

| | | | |
|---|---|---|---|
| 2015/0133145 A1* | 5/2015 | Palanki | G01C 25/00 455/456.1 |
| 2016/0073271 A1* | 3/2016 | Schultz | H04W 4/90 455/404.1 |
| 2017/0280301 A1 | 9/2017 | Chang et al. | |
| 2018/0252521 A1* | 9/2018 | Dormody | G01C 5/06 |
| 2019/0360804 A1 | 11/2019 | Dormody | |
| 2019/0360886 A1 | 11/2019 | Dormody | |
| 2019/0364385 A1 | 11/2019 | Dormody | |
| 2019/0368870 A1 | 12/2019 | Nagarajan | |
| 2019/0368872 A1 | 12/2019 | Nagarajan | |
| 2019/0368873 A1 | 12/2019 | Dormody | |

OTHER PUBLICATIONS

Sankaran et al., "Using Mobile Phone Barometer for Low-Power Transportation Context Detection", SenSys '14 Proceedings of the 12th ACM Conference on Embedded Network Sensor Systems, Nov. 3-6, 2014, pp. 191-205.

Henn et al., "A Comparison of Methods for Filling Gaps in Hourly Near-Surface Air Temperature Data", Journal of Hydometeorology, American Meteorological Society, vol. 14, Jun. 2013, pp. 929-945.

Ghaderi et al., "Deep Forecast: Deep Learning-based Spatio-Temporal Forecasting", ICML 2017 Time Series Workshop, Sydney, Australia, 2017, 6 pages.

Germann et al., "Scale-Dependence of the Predictability of Precipitation from Continental Radar Images. Part I: Description of the Methodology", American Meteorological Society, Monthly Weather Review, vol. 130, Dec. 2002, pp. 2859-2873.

* cited by examiner

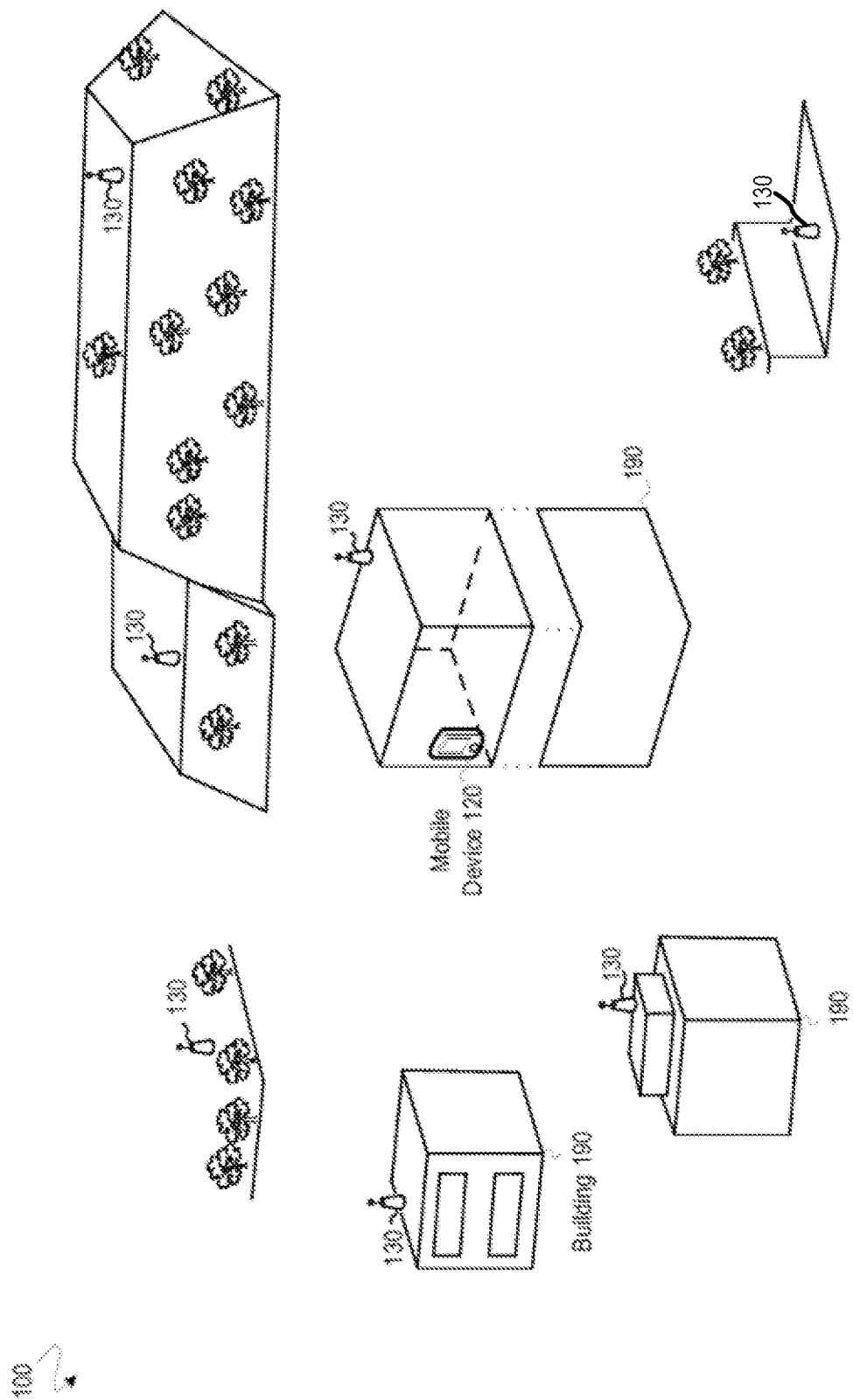

*Illustration of pressure pattern comprising a grid of different reference-level pressure values (p)*

*Illustration of pressure pattern comprising isobars that represent different reference-level pressures*

*Estimated position and at least one sensor of a network (shaded P) are located between isobars*

*Estimated position is not located between same isobars as at least one sensor of a network*

*Estimated position and at least one sensor of a network (shaded P) are separated by only one isobar*

*Estimated position separated from all sensors of a network by more than one isobar*

*Reference-level pressure in grid (shaded p) located closest to estimated position of mobile device is within threshold amount of pressure from reference-level pressure corresponding to sensor of network (shaded P)*

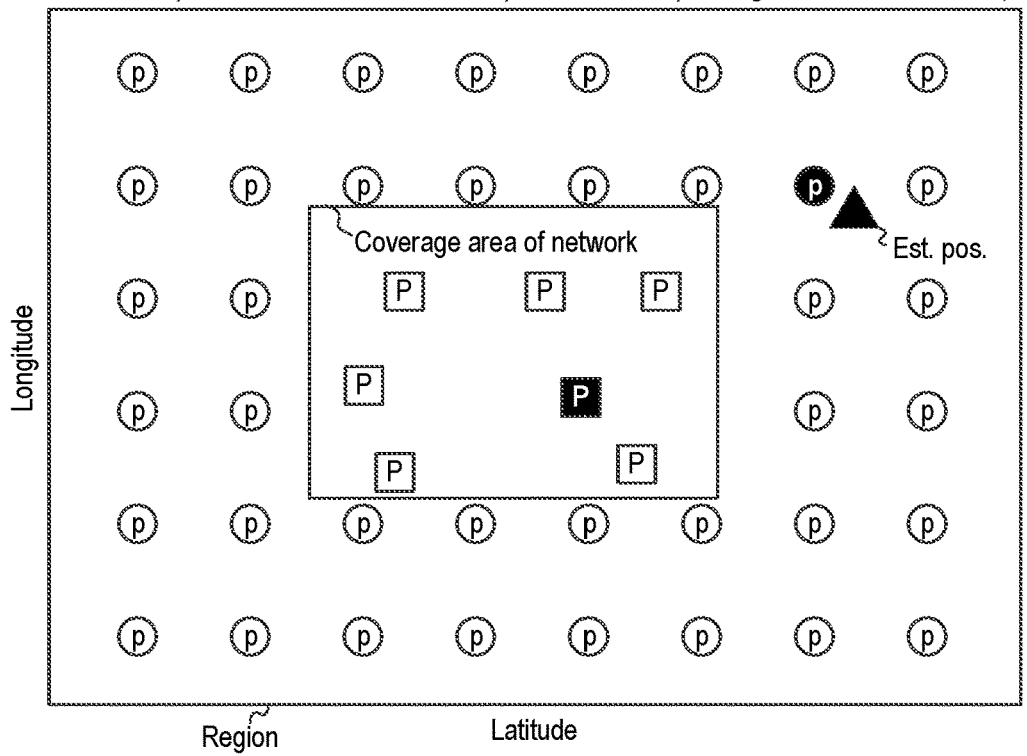

FIG. 6A

*Reference-level pressure in grid (shaded p) located closest to estimated position of mobile device not within threshold amount of pressure from any reference-level pressure corresponding to sensor of network*

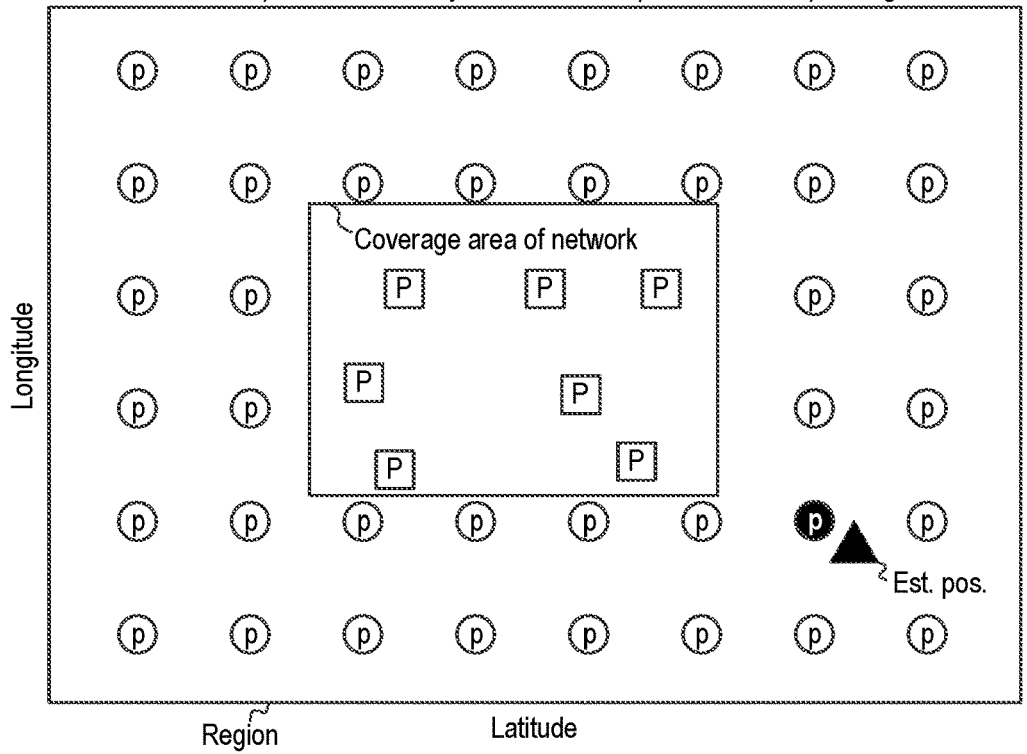

FIG. 6B

SYSTEMS AND METHODS FOR EXTENDING THE SPATIAL COVERAGE OF A REFERENCE PRESSURE NETWORK

BACKGROUND

Determining the exact location of a mobile device (e.g., a smart phone operated by a user) in an environment can be quite challenging, especially when the mobile device is located in an urban environment or is located within a building. Imprecise estimates of the mobile device's altitude, for example, may have life or death consequences for the user of the mobile device since the imprecise altitude estimate can delay emergency personnel response times as they search for the user on multiple floors of a building. In less dire situations, imprecise altitude estimates can lead a user to the wrong area in an environment.

Different approaches exist for estimating an altitude of a mobile device. In a barometric-based location determination system, such as the system shown in FIG. 1A, altitude can be computed using a measurement of pressure from a pressure sensor of a mobile device 120 along with ambient pressure measurement(s) from a network of reference pressure sensors 130, and a measurement of ambient temperature (e.g., from the network or other source). An estimate of an altitude of a mobile device ($h_{mobile}$) can be computed by the mobile device 120 or another device that receives needed information as follows:

$$h_{mobile} = h_{sensor} - \frac{RT_{remote}}{gM} \ln\left(\frac{P_{sensor}}{P_{mobile}}\right), \quad \text{(Equation 1)}$$

where $P_{mobile}$ is the estimate of pressure at the location of the mobile device by a pressure sensor of the mobile device, $P_{sensor}$ is an accurate estimate of pressure at the location of a reference pressure sensor 130 (e.g., accurate to within a tolerated amount of pressure from true pressure, such <5 Pa), $T_{remote}$ is an accurate estimate of temperature (e.g., in Kelvin) at the location of the reference pressure sensor 130 or a different location of a remote temperature sensor, $h_{sensor}$ is an estimated altitude of the reference pressure sensor 130 (e.g., estimated to within a desired amount of altitude error, such as 0.5 meters), g corresponds to the acceleration due to gravity, R is a gas constant, and M is molar mass of air (e.g., dry air or other). The minus sign (−) may be substituted with a plus sign (+) in alternative embodiments of Equation 1, as would be understood by one of ordinary skill in the art. The estimate of pressure at the location of the reference pressure sensor 130 can be converted to an estimated reference-level pressure that corresponds to the reference pressure sensor 130 in that it specifies an estimate of pressure at the latitude and longitude of the reference pressure sensor 130, but at a reference-level altitude that likely differs from the altitude of the reference pressure sensor 130. The reference-level pressure can be determined as follows:

$$P_{ref} = P_{sensor} \times \exp\left(-\frac{gM(h_{ref} - h_{sensor})}{RT_{remote}}\right), \quad \text{(Equation 2)}$$

where $P_{sensor}$ is the estimate of pressure at the location of the reference pressure sensor 130, $P_{ref}$ is the reference-level pressure estimate and $h_{ref}$ is the reference-level altitude. The altitude of the mobile device $h_{mobile}$ can be computed using Equation 1, where $h_{ref}$ is substituted for $h_{sensor}$ and $P_{ref}$ is substituted for $P_{sensor}$. The reference-level altitude $h_{ref}$ may be any altitude, and is often set at mean sea-level (MSL). When two or more reference-level pressure estimates are available, the reference-level pressure estimates are combined into a single reference-level pressure estimate value (e.g., using an average, weighted average, or other suitable combination of the reference pressures), and the single reference-level pressure estimate value is used for the reference-level pressure estimate $P_{ref}$.

The accuracy of the estimated altitude of the mobile device depends on two measurements of pressure. A first measurement is reference-level pressure determined from measurement(s) of pressure from one or more of the reference pressure sensors 130 of the network. A second measurement is a measurement of pressure from an unstable pressure sensor of the mobile device. Due to drift, which is a phenomenon whereby measurements of pressure from an unstable pressure sensor deviate from the true values of pressure over time, the unstable pressure sensor of the mobile device must be regularly calibrated using a reference-level pressure corresponding to a reference pressure sensor. One approach for calibrating a pressure sensor of the mobile device relies on a reference-level pressure determined from measurement(s) of pressure from one or more of the reference pressure sensors 130 of the network for an earlier time. Since an estimated altitude $h_{mobile}$ is computed as:

$$h_{mobile} = h_{ref} - \frac{RT_{remote}}{gM} \ln\left(\frac{P_{ref}}{P_{mobile}}\right), \quad \text{(Equation 3)}$$

an aim for calibrating the pressure sensor of the mobile device is to determine an adjustment to the value of $P_{mobile}$ such that $h_{mobile}$ is within a tolerated amount of distance from the true altitude of the mobile device, $h_{truth}$. During calibration, a known representative altitude of the area in which the mobile device is expected to reside based on an estimated position of the mobile device can be assigned as the representative true altitude of the mobile device, $h_{truth}$, which may or may not include an adjustment of a typical height at which the mobile device is likely to be held above the ground or floor of the area. Once the representative true altitude of the mobile device, $h_{truth}$, is determined, a calibration value C needed to adjust the estimate of pressure at the location of the mobile device, $P_{mobile}$, is determined using a combination of Equation 3 and the following equation to solve for C:

$$h_{truth} = h_{ref} - \frac{RT_{remote}}{gM} \ln\left(\frac{P_{ref}}{C + P_{mobile}}\right). \quad \text{(Equation 4)}$$

As one of ordinary skill in the art will appreciate, the accuracy of reference-level pressures corresponding to reference pressure sensors of a network affects the accuracy of a barometric-based altitude estimate in two ways: (1) determination of the estimated altitude using a reference-level pressure itself, and (2) determination of the estimated altitude using a measurement of pressure from a pressure sensor that was calibrated using a reference-level pressure. When a floor-level accuracy is required for an estimated altitude of a mobile device, only small amounts of error in the reference-level pressure can be tolerated since every 10 Pascals of measurement error can result in 1 meter of error in the estimated altitude of the mobile device as compared to the true altitude of the mobile device. It follows that reliable reference-level pressures are needed for sensor calibration and altitude estimation when floor-level altitude accuracy to within 3 meters of error (or preferably 1 meter of error) from true altitude is desired. The network shown in FIG. 1A will produce reliable reference-level pressures that are within a tolerated amount of pressure from true pressure (e.g., <5 Pa), and that are produced at a suitable frequency (e.g., on demand, within seconds, or at another frequency faster than a rate of change of pressure in a coverage area of the network). Other systems may (i) produce reference-level pressures that are within the tolerated amount of pressure from true pressure, but that are not produced at a suitable frequency, (ii) not produce reference-level pressures that are within the tolerated amount of pressure from true pressure, or (iii) produce reference-level pressures that are within the tolerated amount of pressure from true pressure, but do so for locations that are too far away from a location of the mobile device so as to make those reference-level pressures less reliable when local pressure variations exist near the mobile device or the reference sensors producing the reference-level pressures. Thus, use of the network shown in FIG. 1A is preferred when possible.

Unfortunately, the spatial coverage of the network shown in FIG. 1A is finite. Using reference-level pressures from the network during sensor calibration or altitude estimation for a mobile device that resides outside the coverage area of the network would produce uncertain results since reference-level pressures in the coverage area may not necessarily reflect reference-level pressures outside the coverage area due to pressure variations in a region that includes the coverage area and another area in which the mobile device resides. In these situations when a mobile device is located outside the coverage area of the network, other data sources (e.g., an NOAA Automated Surface Observation Station, METAR weather observation, or other source) that are unreliable for floor-level accuracy may be used to provide reference-level pressures. In some circumstances, no other data sources are available. Thus, solutions are needed for extending the spatial coverage of a network of reference pressure sensors that provide for reliable reference-level pressures for use in calibrating a pressure sensor of a mobile device or estimating an altitude of the mobile device. Such solutions are described herein.

BRIEF DESCRIPTION OF THE DRAWINGS

FIG. 1A depicts a network of reference pressure sensors that are used to calibrate a pressure sensor of a mobile device or to estimate an altitude of the mobile device.

FIG. 6A and FIG. 6B illustrate circumstances when an expected reference-level pressure corresponding to an estimated position of the mobile device is and is not within a threshold amount of pressure from a reference-level pressure corresponding to a reference pressure sensor in a network.

DETAILED DESCRIPTION

Figure 1B:
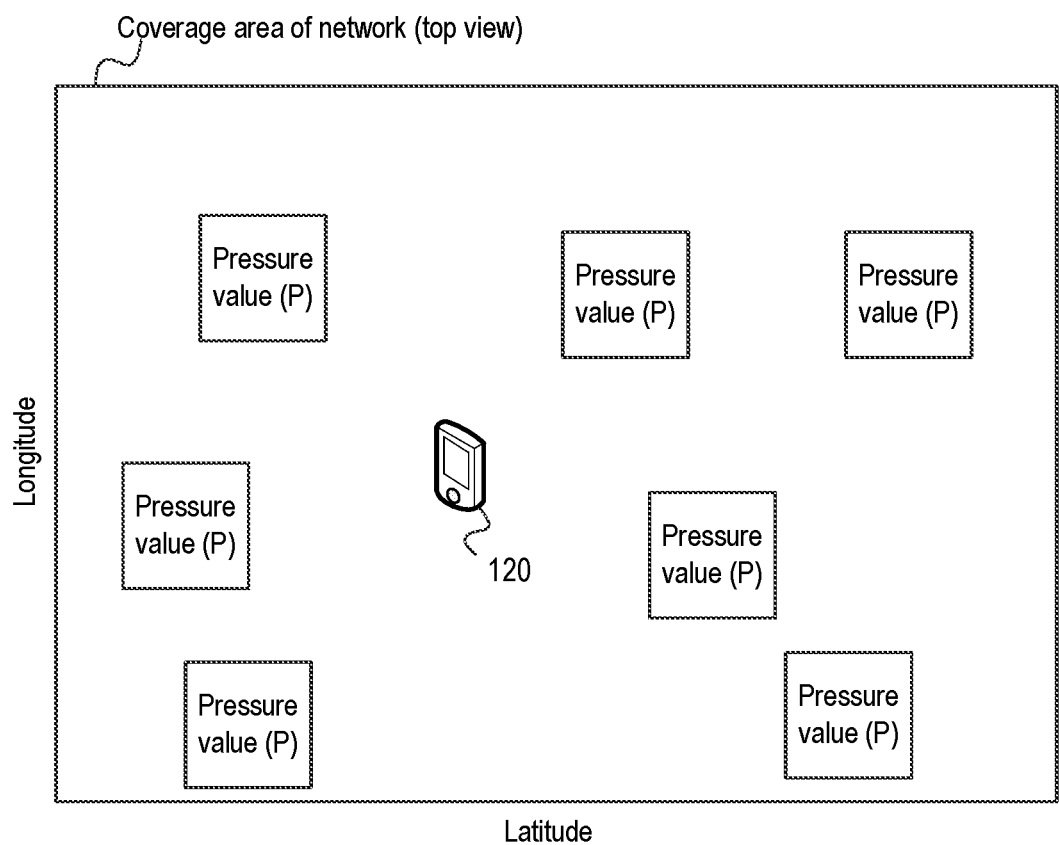
FIG. 1B shows a top-view perspective of reference-level pressure values that are located at two-dimensional locations of respective reference pressure sensors of a network.

Estimated altitudes of mobile devices that are accurate to a floor level in a building are highly desired. Floor-level accuracy is possible using a barometric-based location determination system, such as the network of reference pressure sensors 130 shown in FIG. 1A. The network of reference pressure sensors 130 produces a reference-level pressure ($P_{ref}$) or produces measured pressures that are used by another machine (e.g., the mobile device 120 or a server) to compute the reference-level pressure ($P_{ref}$). The reference-level pressure ($P_{ref}$) is used by a machine (e.g., the mobile device 120 or a server) to estimate an altitude of a mobile device 120 ($h_{mobile}$) as follows:

$$h_{mobile} = h_{ref} - \frac{RT_{remote}}{gM} \ln\left(\frac{P_{ref}}{P_{mobile}}\right), \quad \text{(Equation 5)}$$

where $P_{mobile}$ is an estimate of pressure at the location of the mobile device 120 by a pressure sensor of the mobile device 120, $T_{remote}$ is an accurate estimate of ambient temperature in the network, $h_{ref}$ is a reference-level altitude, g corresponds to the acceleration due to gravity, R is a gas constant, and M is molar mass of air. By way of example, FIG. 1B shows a top-view perspective of reference-level pressure values (e.g., see the squares with letter 'P') that are located at the two-dimensional locations of respective reference pressure sensors 130 of the network.

As described in the Background section of this disclosure, the accuracy of reference-level pressures corresponding to the reference pressure sensors 130 affects the accuracy of the estimated altitude of the mobile device 120 ($h_{mobile}$) in two ways: (1) use of the reference-level pressure reference-level pressure ($P_{ref}$) to determine the estimated altitude, and (2) use of a reference-level pressure when calibrating a pressure sensor of the mobile device that provides a measurement of pressure used to determine the estimated altitude. When a floor-level accuracy is required for an estimated altitude of the mobile device 120, only small amounts of error in the reference-level pressure can be tolerated (e.g., <5 Pa, or a greater value that is a fraction of a maximum pressure error corresponding to a tolerated amount of altitude error for floor-level accuracy). It follows that reliable reference-level pressures are needed for sensor calibration and altitude estimation when floor-level altitude accuracy to within 1-3 meters of altitude error (which corresponds to a maximum pressure error of 10-30 Pa) is needed.

When calibrated, the network of reference pressure sensors 130 shown in FIG. 1A offers significant advantages over other systems like NOAA systems. Unlike other systems, the network consistently produces pressure measurements used to determine reference-level pressures to within a threshold amount of pressure error from true pressure (e.g., a fraction of a maximum pressure error corresponding to a tolerated amount of altitude error for floor-level accuracy). However, the network can permanently or temporarily have limited coverage area (e.g., due to implementation costs that restrict the size of the network, due to partial outages of the network from time-to-time, or other reasons), which limits when the network can be solely used for sensor calibration and altitude estimation to circumstances when the mobile device resides inside the coverage area. When the mobile device resides outside the coverage of the network, pressure data from the network is less reliable. When pressure data from the network is less reliable, pressure data from other sources (e.g., NOAA data) may be available for the area in which the mobile device resides, but the pressure data from other sources may lack the level of accuracy needed to produce a relevant reference-level pressure used for calibrating a pressure of the mobile device or estimating an altitude of the mobile device to within tolerated errors.

Figure 1C:
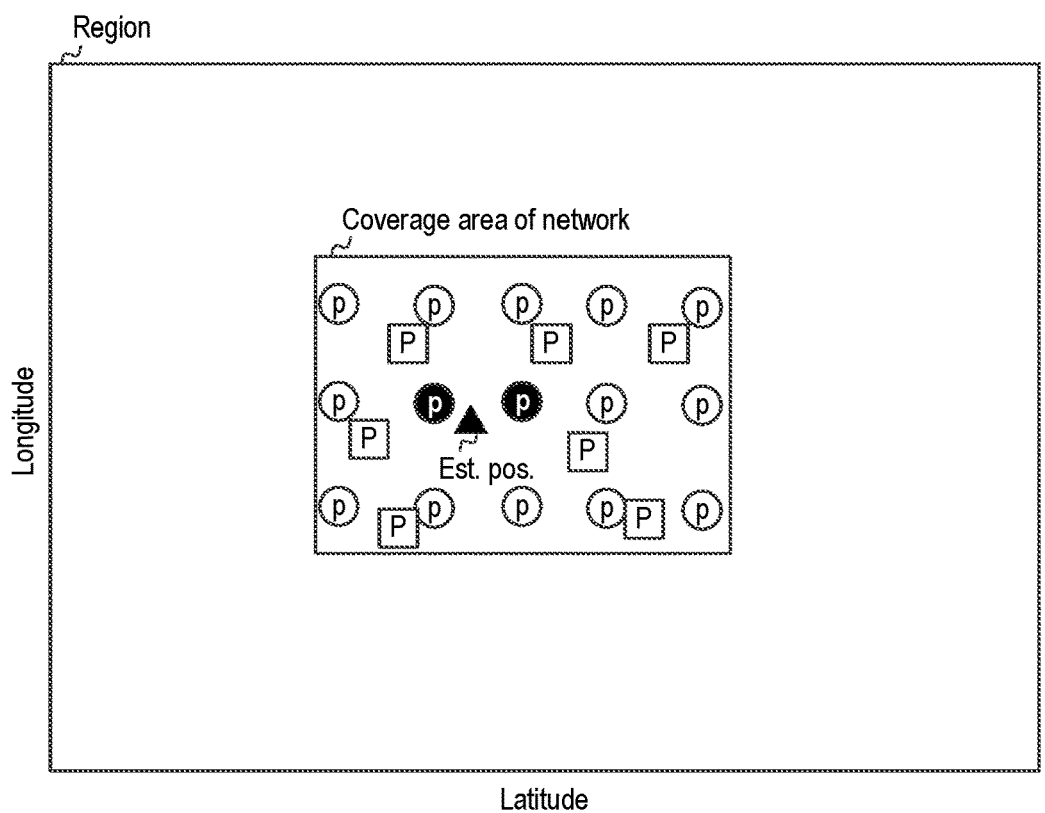
FIG. 1C and FIG. 1D each show a top-view perspective of a grid of pressure values that may or may not be used to calibrate a pressure sensor of a mobile device or to estimate an altitude of the mobile device.
Figure 1D:
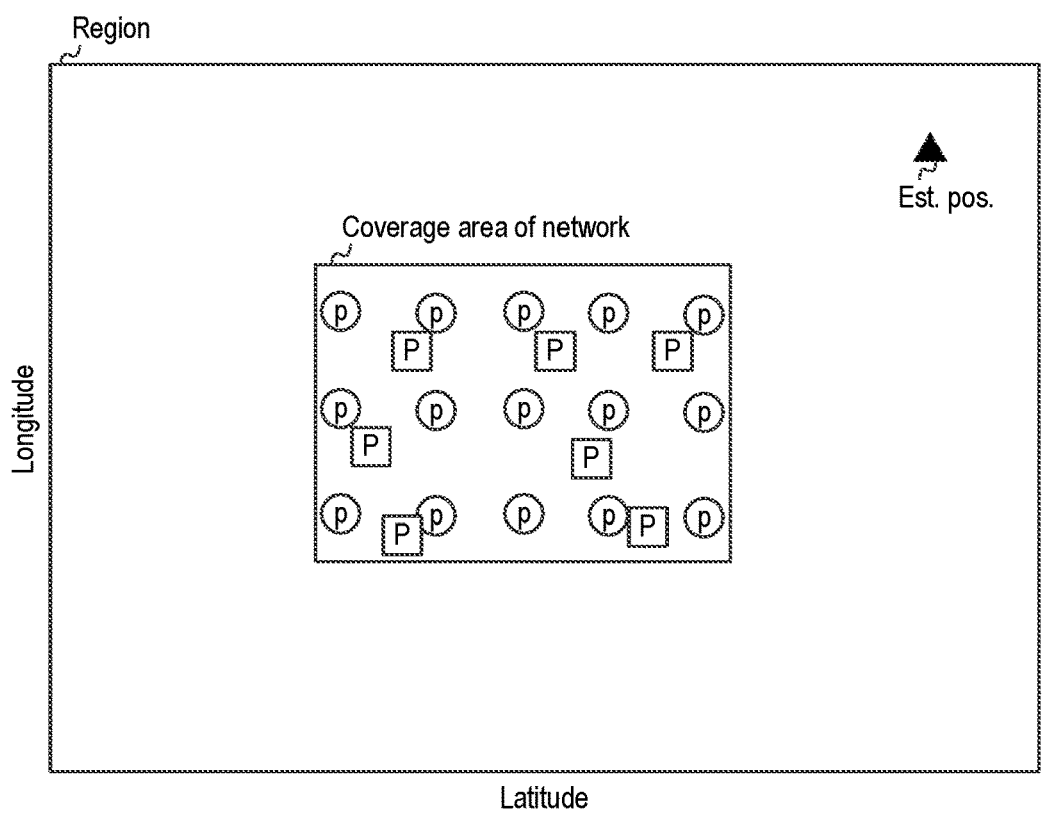

By way of example, FIG. 1C and FIG. 1D each show a top-view perspective of a grid of pressure values (e.g., see the circles with the letter 'p') that can be determined using the reference-level pressure values of FIG. 1B. Such a grid of pressure values can be determined for the coverage area of the network using a well-known Kriging method or other method to produce a gridded pattern of uniformly spaced values based on irregularly spaced measured values. As illustrated by FIG. 1C, pressure values from the grid (e.g., see the shaded circles) with locations that are closest to an estimated position of the mobile device can be combined (e.g., averaged) into a singular reference-level pressure that can be used to calibrate a pressure sensor of the mobile device or to estimate an altitude of the mobile device. Selection of the closest pressure values is desired since such pressure values are considered to more-accurately reflect a reference-level pressure at the latitude and longitude of the mobile device compared to pressure values with locations that are further away from the estimated position of the mobile device. Using a grid of pressure values for a coverage area works well when the mobile device is located inside the coverage area. As illustrated by FIG. 1D, such a grid cannot be reliably used alone when the location of the mobile device (as reflected by an estimated position of the mobile device) is not inside the coverage area of the network since even the closest pressure value in the grid cannot be assumed to accurately reflect a reference-level pressure at the latitude and longitude of the mobile device given possible pressure variation in the region. As a consequence, calibration and altitude estimation may not be possible, or less accurate calibration and altitude estimate must be suffered if other sources (e.g., NOAA data) are used to produce pressure data for an area in which the mobile device resides.

Figure 1E:
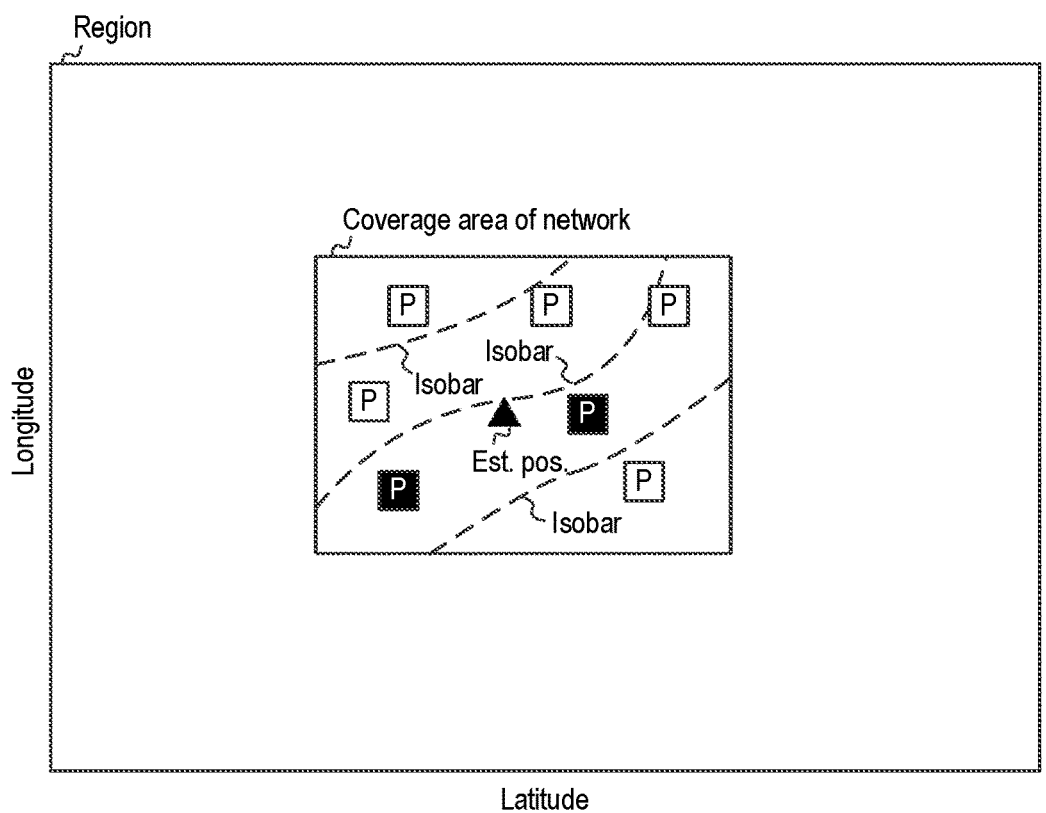
FIG. 1E and FIG. 1F each show a top-view perspective of pressure isobars that may or may not be used to calibrate a pressure sensor of a mobile device or to estimate an altitude of the mobile device.
Figure 1F:
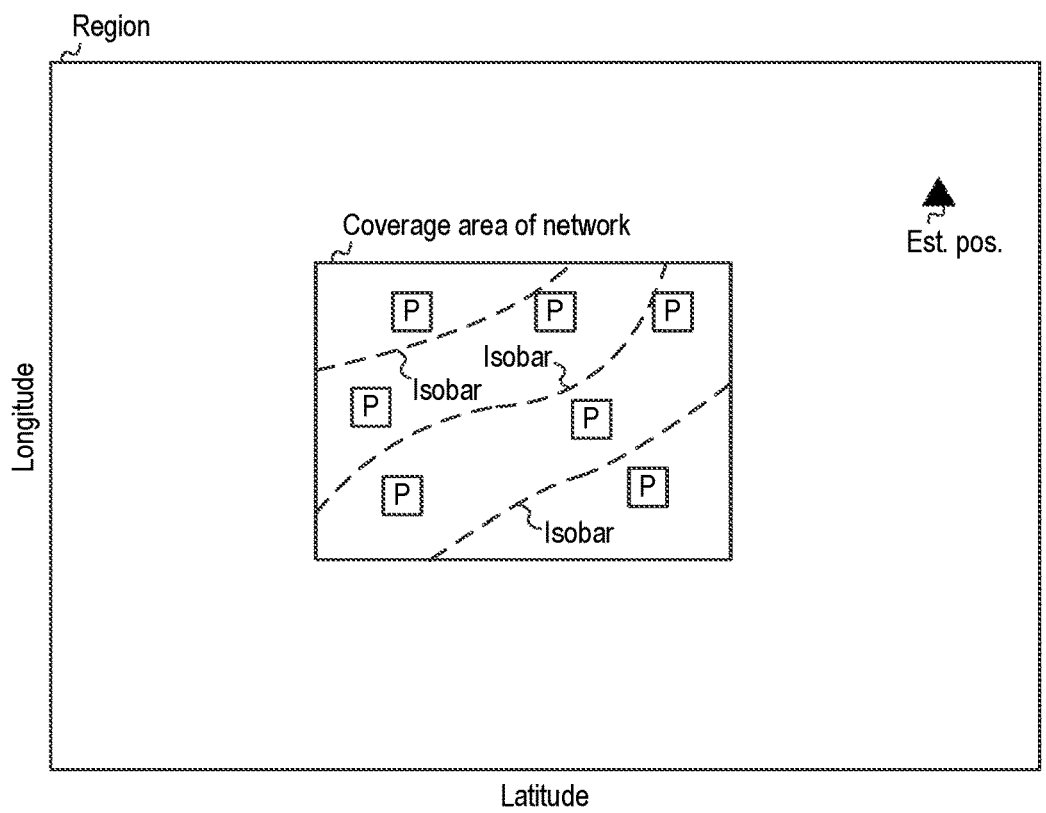

By way of another example, FIG. 1E and FIG. 1F each show a top-view perspective of pressure isobars (e.g., see the dashed lines) that can be determined using the grid of pressure values from FIG. 1C and FIG. 1D using techniques that are known by one of ordinary skill in the art. Each isobar represents a reference-level pressure at those locations, and the spacing between isobars can be set to a maximum amount of pressure correlated to a maximum calibration error that can be tolerated (e.g., 2-10 Pa) or a maximum altitude error that can be tolerated (e.g., 10 Pa for every meter of allowed altitude error). As illustrated by FIG. 1E, neighboring isobars can be used to identify reference-level pressures with positions that occupy the same space between those neighboring isobars as an estimated position of the mobile device (e.g., see the shaded squares and triangle). An assumption can be made that any of or a combination of the reference-level pressures that occupy the same space as the estimated position more-accurately reflects a reference-level pressure at the latitude and longitude of the mobile device compared to other reference-level pressures with locations that occupy other spaces between other pairs of neighboring isobars. Thus, any of or a combination of the reference-level pressures that occupy the same space as the estimated position can be used as the reference-level pressure value for sensor calibration or altitude estimation since those pressures do not vary from the reference-level pressure corresponding to a location of the mobile device by more than the maximum amount of pressure. As illustrated by FIG. 1F, when the location of the mobile device (as reflected by an estimated position of the mobile device) is not inside the coverage area of the network, the isobars do not reliably extend outside of the coverage area, and cannot be used with reasonable certainty to identify reference-level pressures that occupy a space of similar pressures that is also occupied by the estimated position of the mobile device. As a consequence, calibration and altitude estimation may not be possible, or less accurate calibration and altitude estimate must be suffered if other sources (e.g., NOAA data) are used to produce isobars that extend outside of the coverage area.

As mentioned when discussing the illustrations in FIG. 1D and FIG. 1F, when the mobile device resides outside the coverage of the network, pressure data from the network cannot be assumed to reflect a reference-level pressure corresponding to a location of the mobile device, and less accurate calibration and altitude estimation must be suffered if pressure data from other sources is used for sensor calibration and altitude estimation. However, as described below, first and second approaches use pressure data from the network along with pressure data from other sources to improve the accuracy of sensor calibration and altitude estimation while the mobile device is outside the coverage area of the network compared to using only the pressure data from other sources or only the pressure data from the network. In particular, first and second approaches initially determine that an estimated position of a mobile device resides outside a coverage area of a network of reference pressure sensors, determine reference-level pressures corresponding to reference pressure sensors of the network using measurements of pressure from the network, determine a pressure pattern for a region that includes the estimated position and an area not included in the coverage area of the network without using measurements of pressure from the network, and use the reference-level pressures corresponding to reference pressure sensors of the network along with the pressure pattern to determine a reference-level pressure value for use in calibrating a pressure sensor of the mobile device or for use in estimating an altitude of the mobile device.

Under circumstances when pressure data from other sources is not available or desirable for use in sensor calibration and altitude estimation, a third approach uses wind data measured in the region (e.g., in the coverage area) to adjust locations of reference-level pressures from inside the coverage area to outside the coverage area.

First Approach for Extending the Spatial Coverage of a Network of Reference Pressure Sensors A first approach for extending the spatial coverage of a network of reference pressure sensors in a region (e.g., for use in calibrating a pressure sensor of a mobile device, or estimating an altitude of the mobile device) uses pressure data from a first system (e.g., a non-network source like a NOAA system) to determine a pressure pattern in the region, and depending on different circumstances, uses the pressure pattern to identify a reference-level pressure corresponding to a reference pressure sensor from a second system (e.g., the network).

Figure 2:
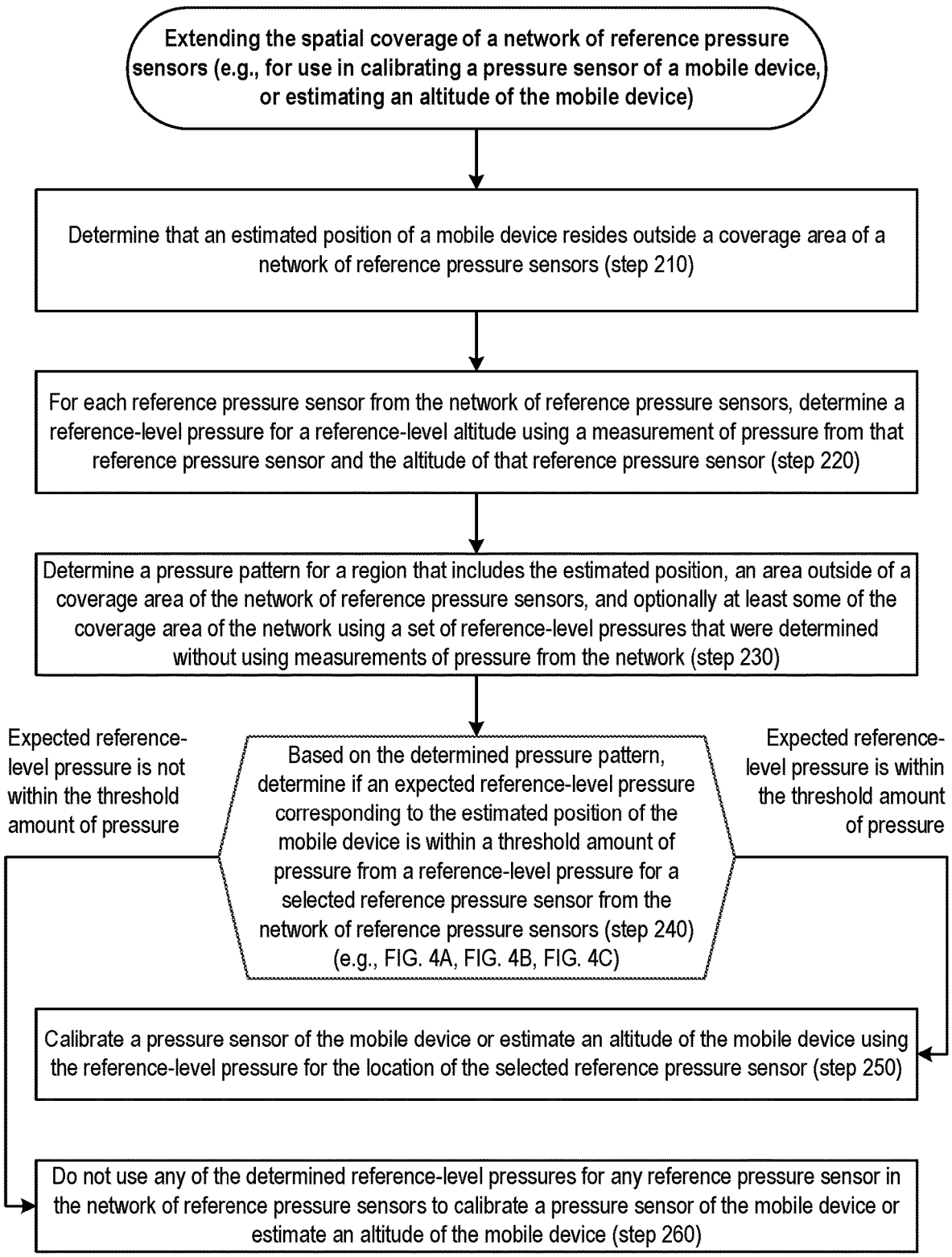
FIG. 2 shows one approach for extending the spatial coverage of a network of reference pressure sensors based on a pressure pattern of a region.

One method for extending the spatial coverage of a network of reference pressure sensors based on a pressure pattern of a region is shown in FIG. 2.

As shown in FIG. 2, a determination is made that an estimated position of a mobile device resides outside a coverage area of a network of reference pressure sensors (step 210). In one embodiment of step 210 and similar steps of other methods, an estimate of the mobile device's position is determined (e.g., using known GNSS-based, terrestrial-based or other position determination approaches for estimating two-dimensional or three-dimensional positions of mobile devices), and the estimated position is compared to the coverage area. If the estimated position is not inside the coverage area, then the mobile device is determined to reside outside the coverage area. Of course, other known approaches for determining if a mobile device is inside an area can be used. In different embodiments, step 210 is performed using a processor of a mobile device, a server, and/or another suitable machine.

For each reference pressure sensor of the network, a reference-level pressure for a reference-level altitude is determined using a measurement of pressure from that reference pressure sensor and the altitude of that reference pressure sensor (step 220). By way of example, each reference-level pressure may be determined using Equation 2 from the Background section of this disclosure. In different embodiments, step 220 is performed using a processor of the reference pressure sensor, a mobile device, a server, and/or another suitable machine.

Figure 3A:
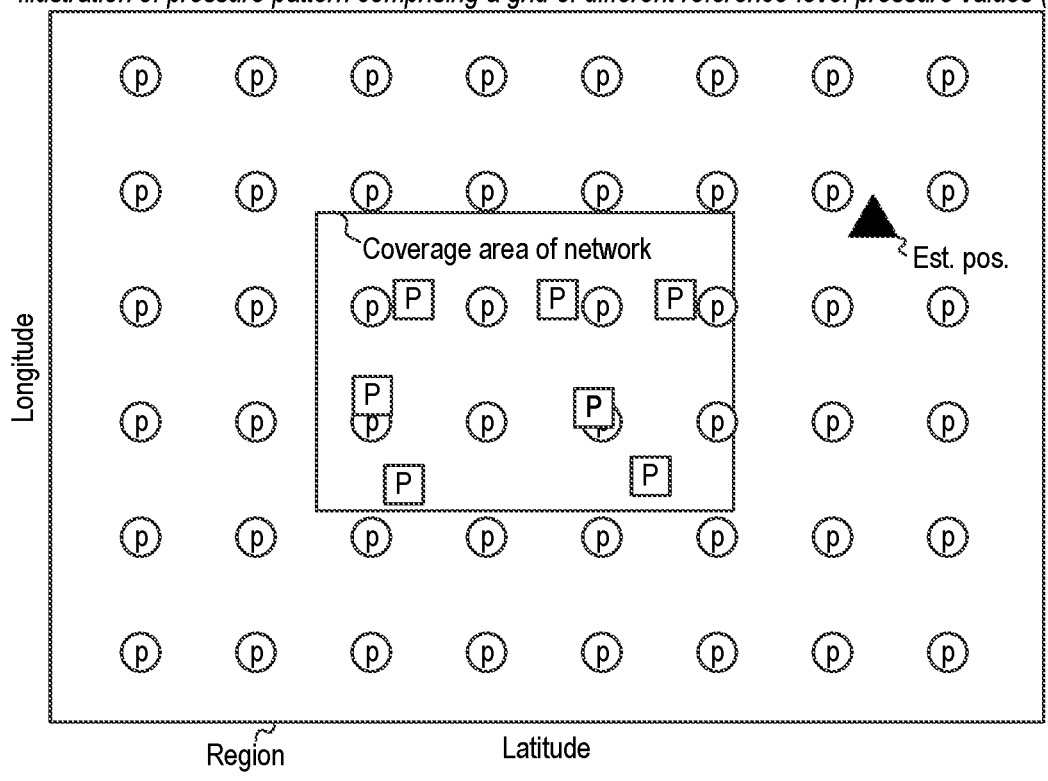
FIG. 3A depicts a pressure pattern formed by a grid of reference-level pressure values.
Figure 3B:
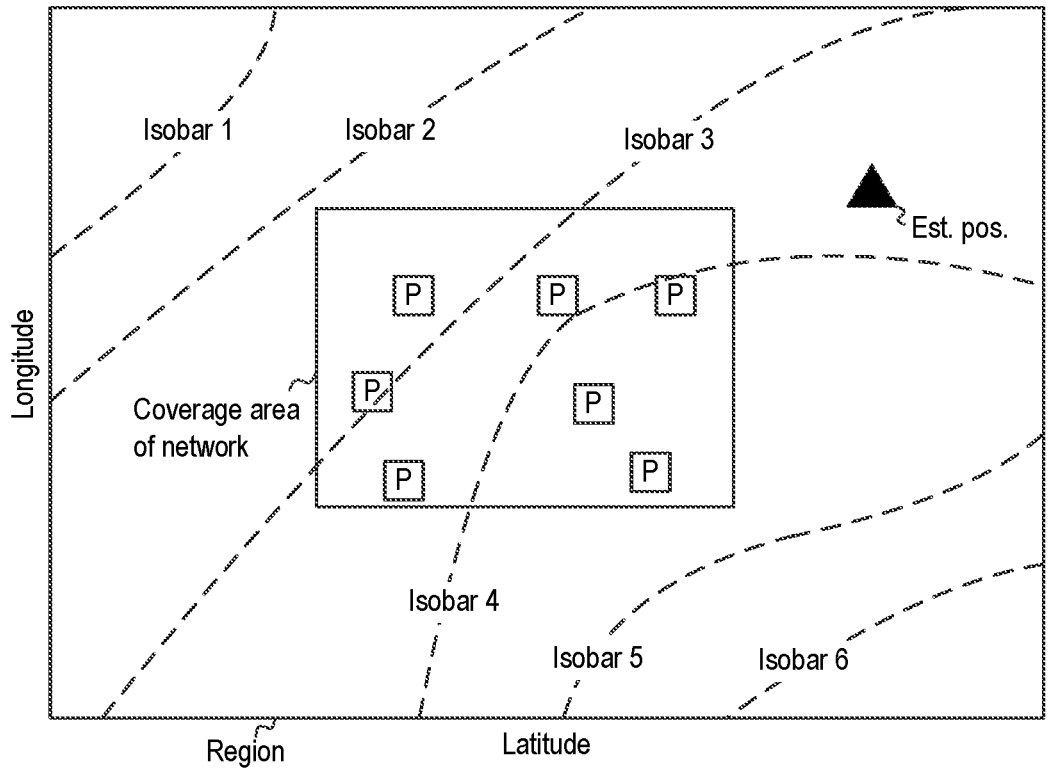
FIG. 3B depicts a pressure pattern formed by different isobars that represent reference-level pressure values.

A set of reference-level pressures that were not determined using measurements of pressure from the network of reference pressure sensors are used to determine a pressure pattern for a region that includes the estimated position of the mobile device, an area in which the mobile device resides outside of the coverage area of the network, and optionally at least some of the coverage area of the network (step 230). By way of example, the set of reference-level pressures that were not determined using measurements of pressure from the network may include reference-level pressures from public information like NOAA weather maps, such as NOAA High Resolution Rapid Refresh. NOAA data may be available on an hourly basis or as frequent as every 10 minutes for paid services. Optionally, the reference-level pressures corresponding to the reference pressure sensors may be used as additional information for determining the pressure pattern in one embodiment, but not all embodiments. Such reference-level pressures may be used to add more resolution to part of the pressure pattern inside the coverage area. A pressure pattern of a region can be represented in different forms, including a grid of points representing different expected reference-level pressures at different locations in the region, or a group of isobars representing different reference-level pressures in the region. By way of example, FIG. 3A depicts a pressure pattern formed by a grid of reference-level pressure values at locations that are represented by circles with the letter 'p'. For perspective, the reference-level pressures corresponding to reference pressure sensors of the network shown by squares with the letter 'P' are provided. By way of example, FIG. 3B depicts a pressure pattern formed by different isobars that are represented by dashed lines. Each isobar represents a reference-level pressure value. For perspective, the reference-level pressures corresponding to reference pressure sensors of the network are shown by squares with the letter 'P'. In different embodiments, step 230 is performed using a processor of a mobile device, a server, and/or another suitable machine.

Based on the determined pressure pattern, a determination is made as to whether an expected reference-level pressure corresponding to the estimated position of the mobile device is within a threshold amount of pressure from a reference-level pressure corresponding to a selected reference pressure sensor from the network (step 240). Different embodiments of step 240 are provided in FIG. 4A, FIG. 4B and FIG. 4C, which are described after this discussion of FIG. 2. By way of example, the threshold amount of pressure may be based on a tolerated calibration error and/or tolerated altitude error (e.g., 2 Pa, 5 Pa, 10 Pa or 30 Pa, where every 1 meter of altitude error corresponds to 10 Pa of pressure error). In different embodiments, step 240 is performed using a processor of a mobile device, a server, and/or another suitable machine.

If the expected reference-level pressure corresponding to the estimated position of the mobile device is within the threshold amount of pressure from the reference-level pressure corresponding to the selected reference pressure sensor, the reference-level pressure corresponding to the selected reference pressure sensor is used to calibrate a pressure sensor of the mobile device or to estimate an altitude of the mobile device (step 250). In different embodiments, step 250 is performed using a processor of a mobile device, a server, and/or another suitable machine.

If the expected reference-level pressure corresponding to the estimated position of the mobile device is not within the threshold amount of pressure from the reference-level pressure corresponding to the selected reference pressure sensor, none of the determined reference-level pressures for any reference pressure sensor in the network are used to calibrate a pressure sensor of the mobile device or to estimate an altitude of the mobile device (step 260). In different embodiments, step 260 is performed using a processor of a mobile device, a server, and/or another suitable machine.

Two embodiments of step 240 discussed below use a pressure pattern that includes a set of isobars that represent different reference-level pressures for the reference-level altitude. When determining the pressure pattern during step 240, evenly-spaced isobars at intervals equal to the threshold amount of pressure can be used to form the pressure pattern, where (i) one isobar may pass through the estimated position of the mobile device so the largest defined area between isobars is created to compare the location of the estimated position against locations of reference-level pressures from the reference pressure sensors of the network, or (ii) the isobars are drawn relative to some minimum or maximum value instead of the estimated position. Alternatively, less than the threshold amount of pressure can be used as spacing between the isobars.

Figure 4A:
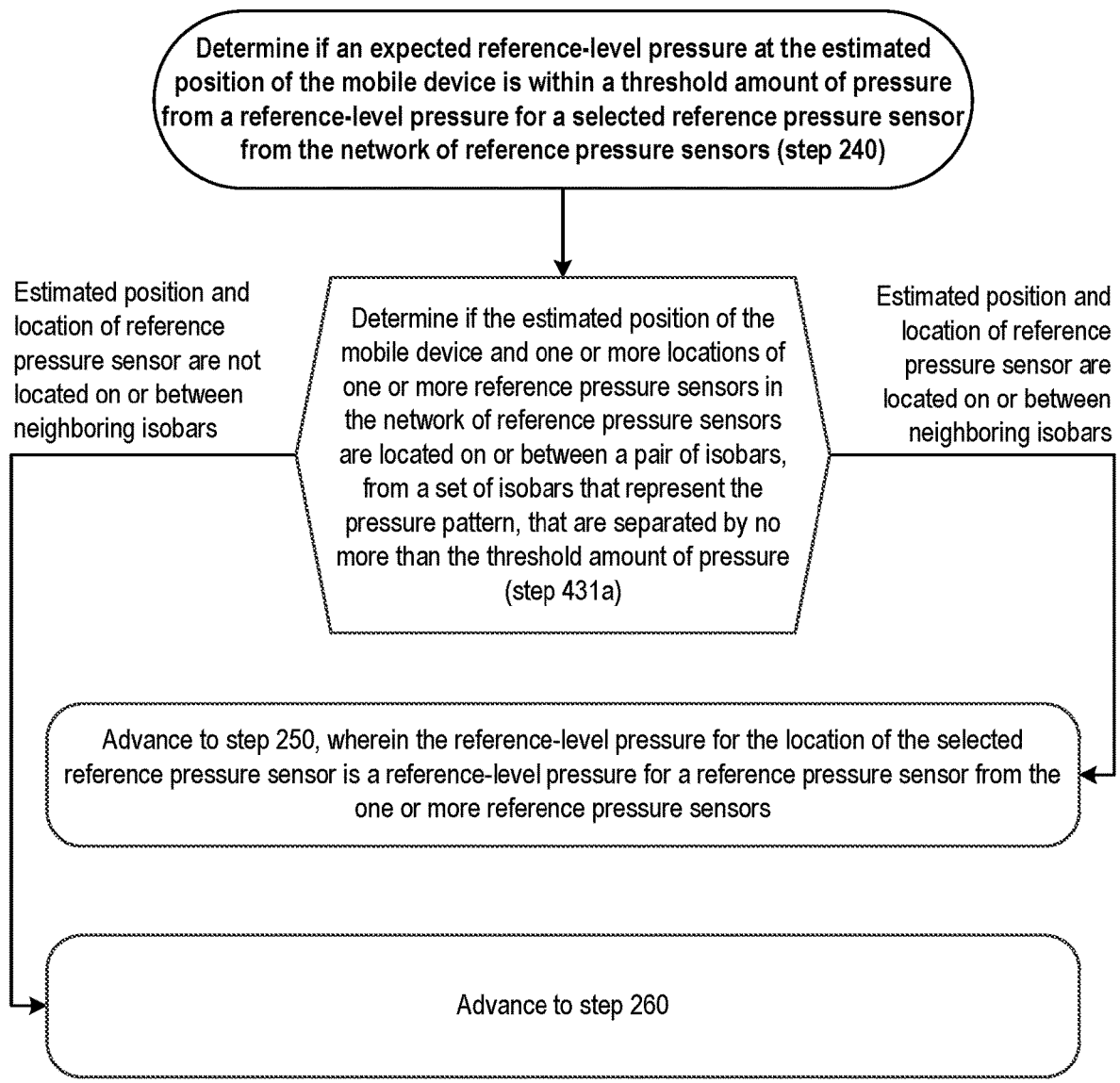
FIG. 4A, FIG. 4B and FIG. 4C show different embodiments for determining if an expected reference-level pressure corresponding to an estimated position of the mobile device is within a threshold amount of pressure from a reference-level pressure corresponding to a reference pressure sensor from a network.
Figure 5A:
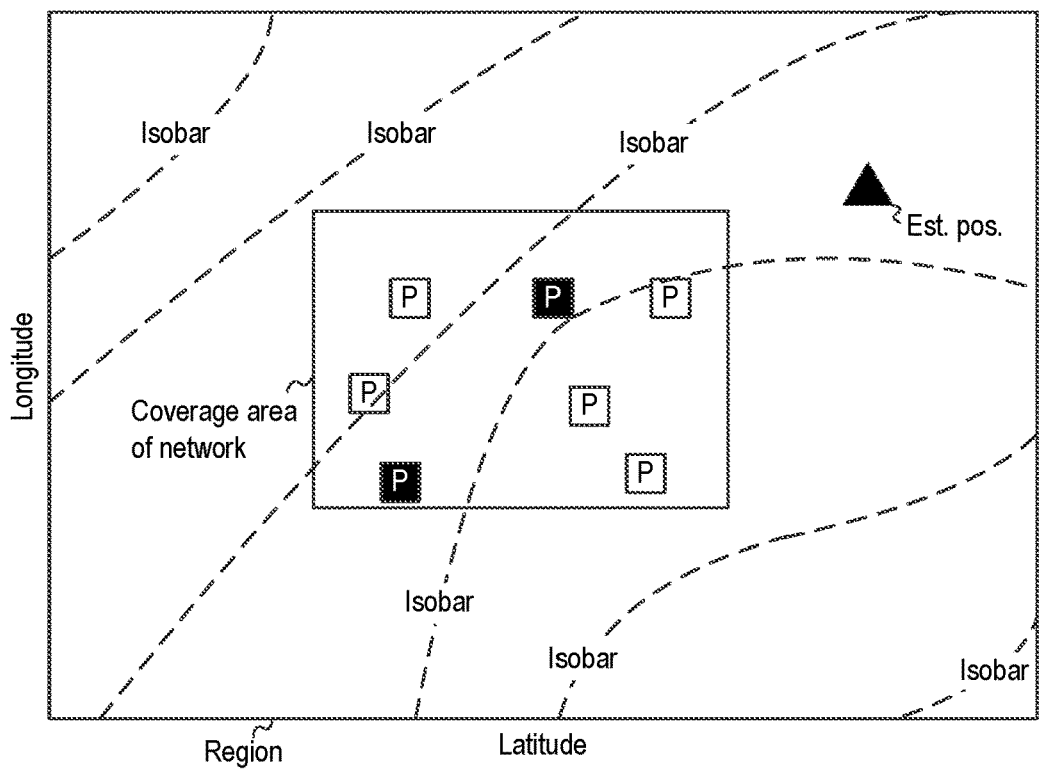
FIG. 5A and FIG. 5B illustrate circumstances when an estimated position of a mobile device and at least one reference pressure sensor location are and are not between the same neighboring isobars.
Figure 5B:
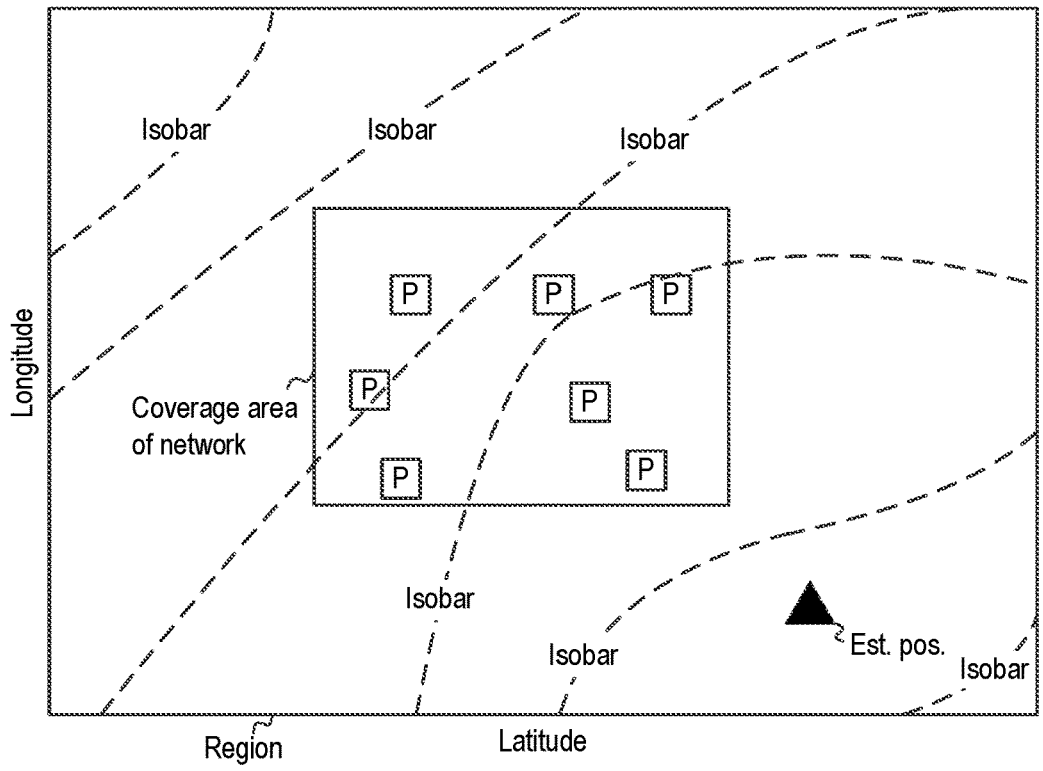

One embodiment of step 240 that uses isobars in the pressure pattern is shown in FIG. 4A. During this embodiment of step 240, a determination is made as to whether the estimated position of the mobile device and one or more locations of one or more reference pressure sensors in the network are located on or between a pair of isobars, from the set of isobars, that are separated by no more than the threshold amount of pressure (step 431*a*). By way of example, FIG. 5A illustrates circumstances when the estimated position of the mobile device and at least one reference pressure sensor location exist between the same neighboring isobars, and FIG. 5B illustrates circumstances when the estimated position and at least one reference pressure sensor location do not exist between the same neighboring isobars. If the estimated position of the mobile device and one or more locations of one or more reference pressure sensors in the network of reference pressure sensors are located on or between the same pair of neighboring isobars, the process advances to step 250, wherein the reference-level pressure corresponding to the selected reference pressure sensor is a reference-level pressure for a reference pressure sensor from the one or more reference pressure sensors located on or between the same pair of neighboring isobars as the estimated position (e.g., the reference-level pressure for a reference pressure sensor from the one or more reference pressure sensors that is closest to the estimated position of the mobile device). If the estimated position of the mobile device and one or more locations of one or more reference pressure sensors in the network of reference pressure sensors are not located on or between the same pair of neighboring isobars, the process advances to step 260.

Figure 4B:
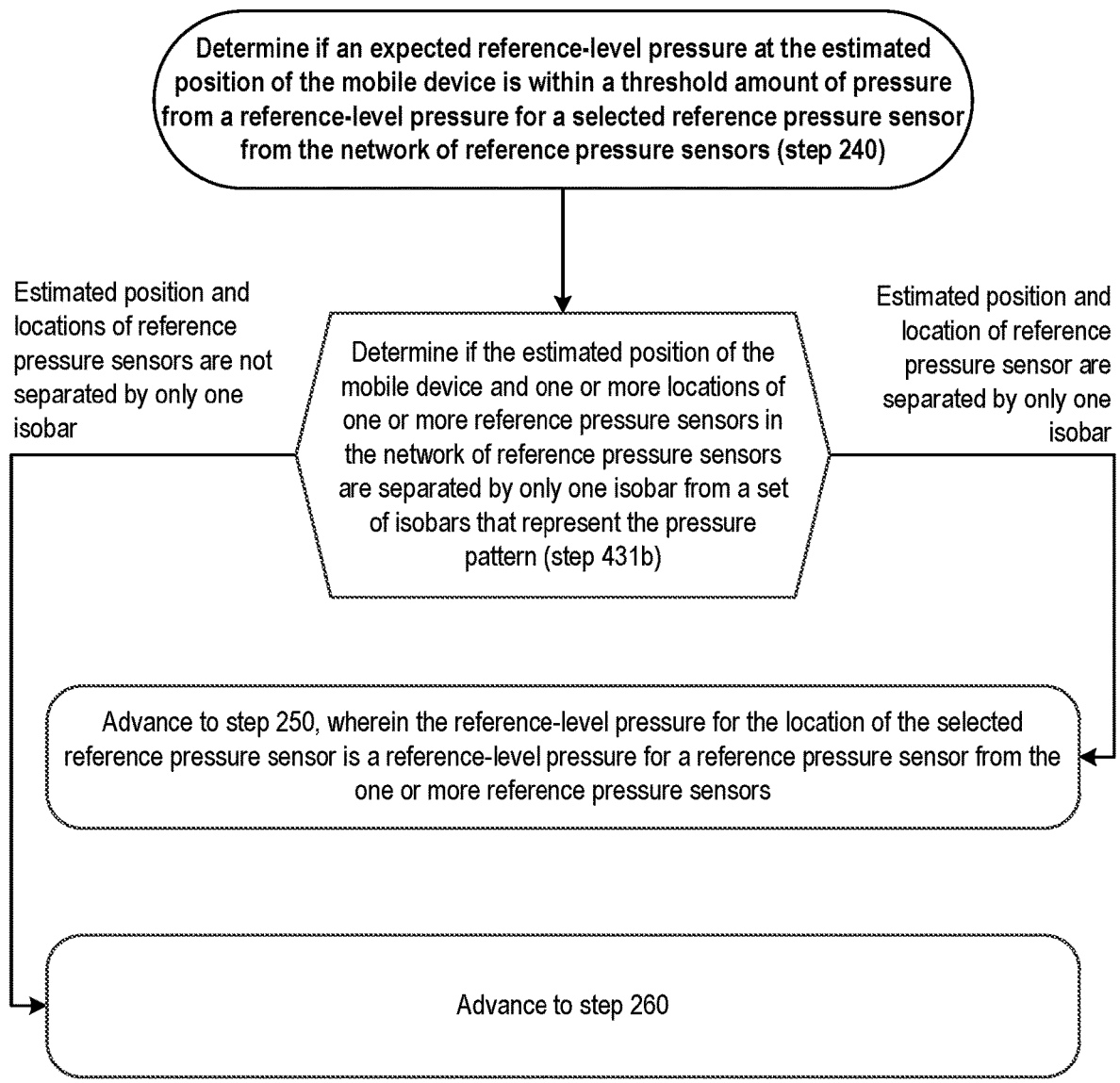
Figure 5C:
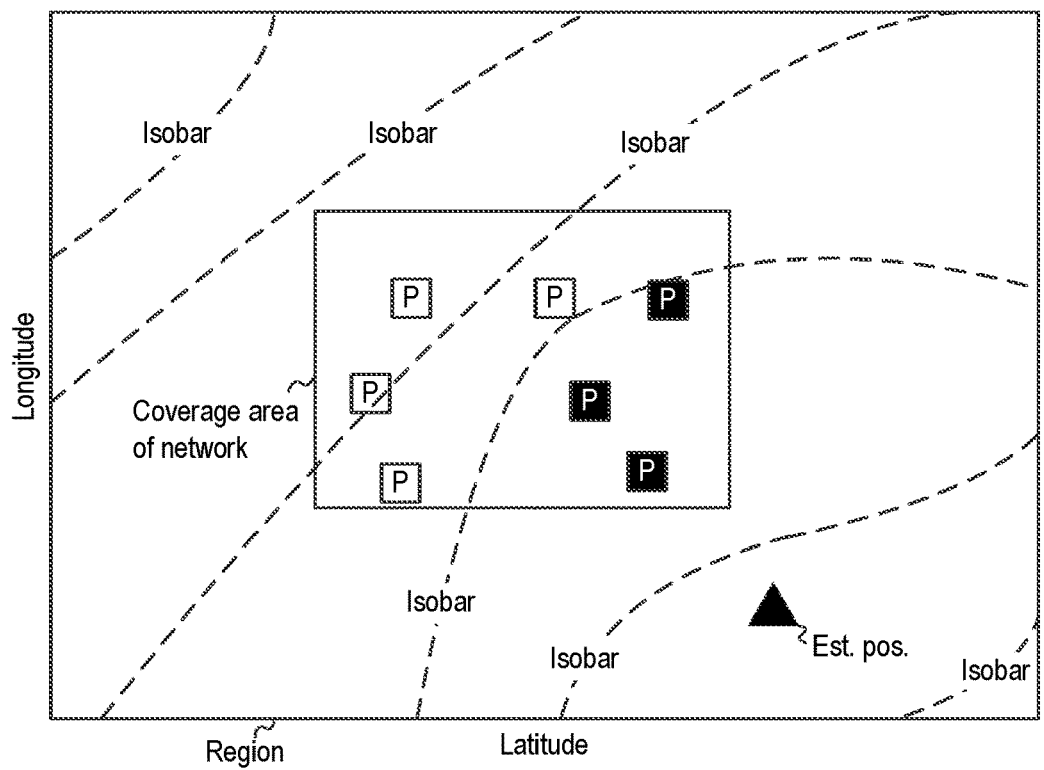
FIG. 5C and FIG. 5D illustrate circumstances when an estimated position of a mobile device and at least one reference pressure sensor location are and are not separated by only one isobar.
Figure 5D:
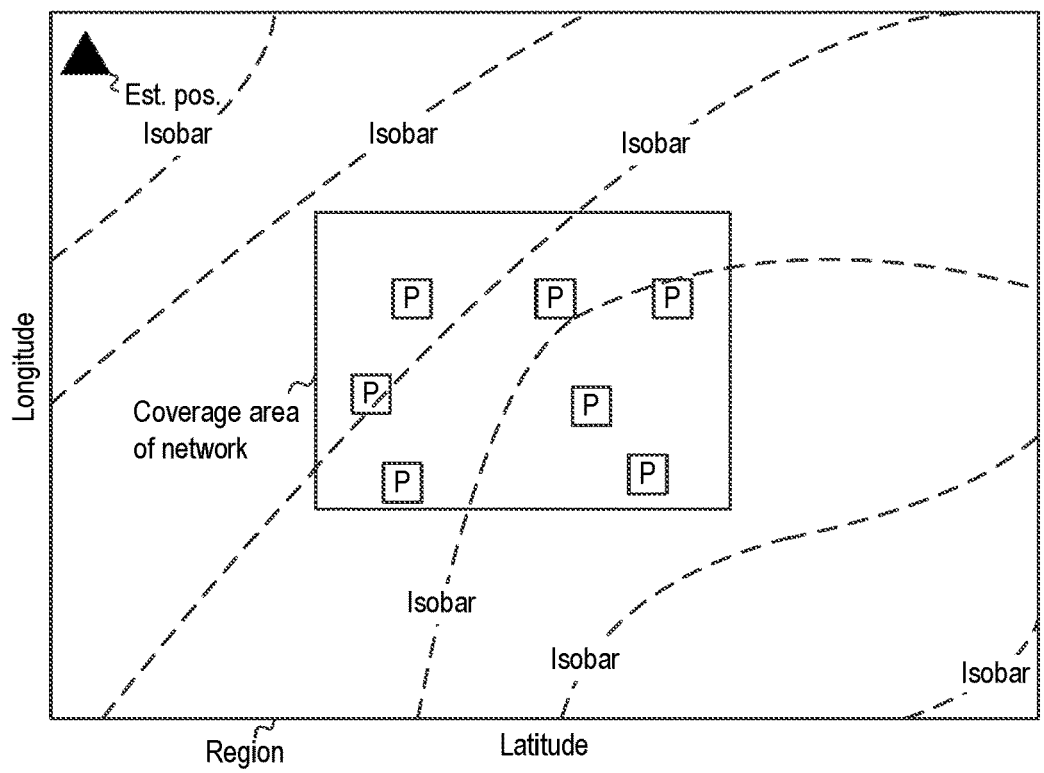

Another embodiment of step 240 that uses isobars in the pressure pattern is shown in FIG. 4B. During this embodiment of step 240, a determination is made as to whether the estimated position of the mobile device and one or more locations of one or more reference pressure sensors in the network of reference pressure sensors are separated by only one isobar from the set of isobars (step 431*b*). By way of example, FIG. 5C illustrates circumstances when the estimated position of the mobile device and at least one reference pressure sensor location are separated by only one isobar, and FIG. 5D illustrates circumstances when the more than one isobar separates the estimated position and all reference pressure sensor locations. If the estimated position of the mobile device and one or more locations of one or more reference pressure sensors in the network of reference pressure sensors are separated by only one isobar from the set of isobars, the process advances to step 250, wherein the reference-level pressure of the location corresponding to the selected reference pressure sensor is a reference-level pressure for a reference pressure sensor from the one or more reference pressure sensors that are separated by only one isobar from the estimated position (e.g., the reference-level pressure for a reference pressure sensor from the one or more reference pressure sensors that is closest to the estimated position of the mobile device). If the estimated position of the mobile device and no locations of reference pressure sensors in the network of reference pressure sensors are separated by only one isobar from the set of isobars, the process advances to step 260.

The likelihood of the estimated position of the mobile device and a reference pressure sensor being on or between a pair of isobars or being separated by only one isobar is higher when larger distances separate neighboring isobars compared to when smaller distances separate neighboring isobars. Thus, the processes of FIG. 4A and FIG. 4B are particularly useful where meteorological weather pressure patterns exhibit larger spacing between isobars. Such pressure patterns occur during summer time over the continental USA, in the tropical latitudes and regions of high pressure occurring behind cold fronts. However, use of FIG. 4A and FIG. 4B need not be limited to these areas.

Figure 4C:
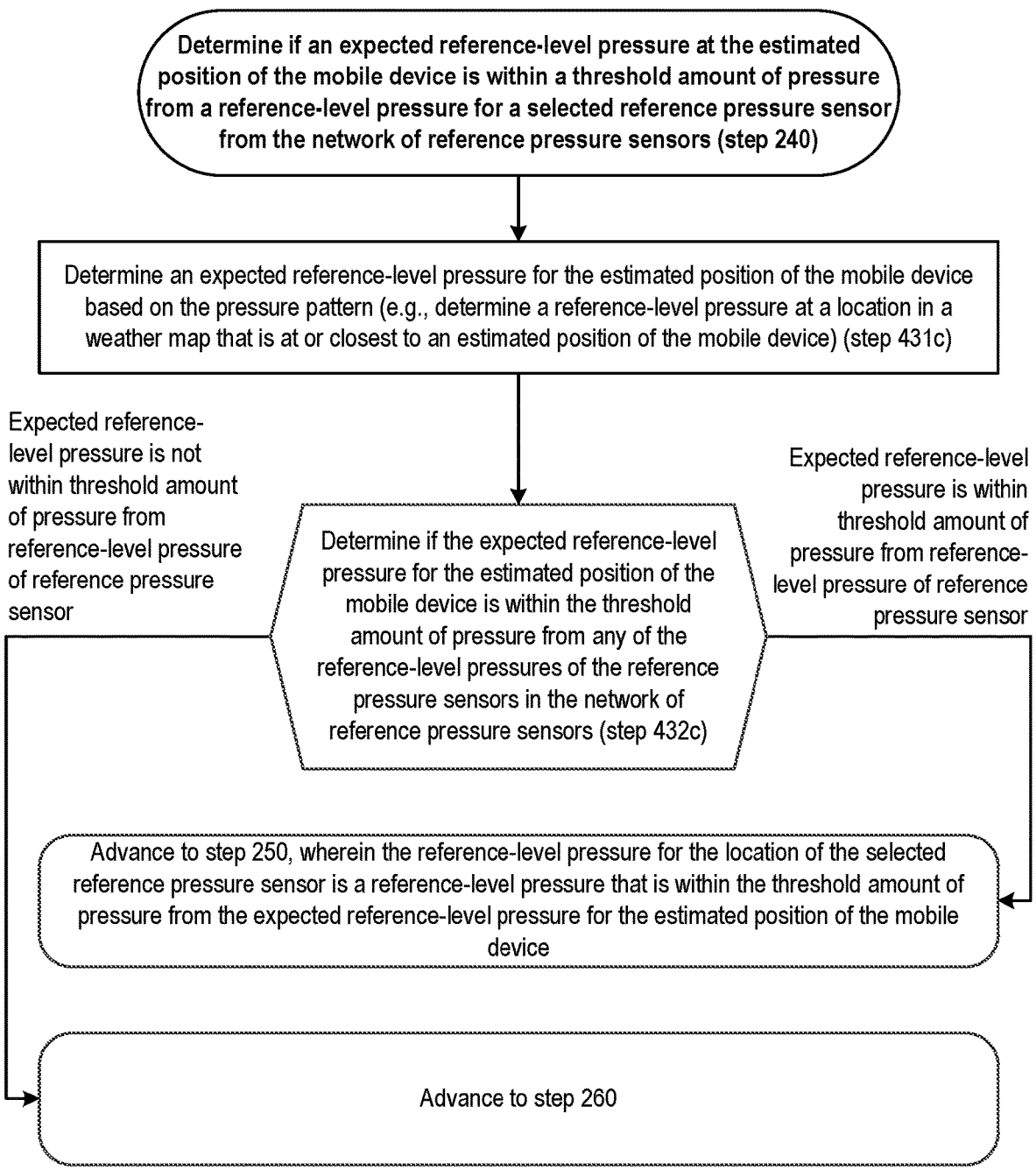

The pressure pattern need not use isobars, and can alternatively use a grid of pressure values. One embodiment of step 240 that uses a grid in the pressure pattern is shown in FIG. 4C. During this embodiment of step 240, an expected reference-level pressure corresponding to the estimated position of the mobile device is determined using one or more reference-level pressures from the grid in the pressure pattern (step 431*c*). In one implementation, the expected reference-level pressure is a reference-level pressure from the pressure pattern (e.g., a weather map) that is closest to the estimated position of the mobile device. In another implementation, the expected reference-level pressure is a combination (e.g., an average) of n reference-level pressures from the pressure pattern that are closest to the estimated position of the mobile device, for any value of n (e.g., n=4). A determination is made as to whether the expected reference-level pressure corresponding to the estimated position of the mobile device is within the threshold amount of pressure from any of the reference-level pressures corresponding to the reference pressure sensors in the network (step 432*c*). By way of example, FIG. 6A illustrates circumstances when the expected reference-level pressure corresponding to the estimated position of the mobile device is within the threshold amount of pressure from at least one reference-level pressure corresponding to a reference pressure sensor in the network, and FIG. 6B illustrates circumstances when the expected reference-level pressure is not within the threshold amount of pressure from any of the reference-level pressures corresponding to the reference pressure sensors in the network. If the expected reference-level pressure corresponding to the estimated position of the mobile device is within the threshold amount of pressure from any of the reference-level pressures corresponding to the reference pressure sensors, the process advances to step 250, wherein the reference-level pressure corresponding to the selected reference pressure sensor is a reference-level pressure that is within the threshold amount of pressure from the expected reference-level pressure corresponding to the estimated position of the mobile device (e.g., a reference-level pressure with a location that is closest to the estimated position of the mobile device). If the expected reference-level pressure corresponding to the estimated position of the mobile device is not within the threshold amount of pressure from any of the reference-level pressures corresponding to the reference pressure sensors, the process advances to step 260.

Second Approach for Extending the Spatial Coverage of a Network of Reference Pressure Sensors A second approach for extending the spatial coverage of a network of reference pressure sensors (e.g., for use in calibrating a pressure sensor of a mobile device, or estimating an altitude of the mobile device) (i) determines pressure contours (e.g., isobars) that represent reference-level pressures in a given region, (ii) selects a pressure contour (e.g., a pressure contour that is closest to or next to an estimated position of the mobile device), (iii) adjusts the value of the pressure contour using pressure values from the network, and (iv) uses the adjusted pressure value of that contour as the reference-level pressure for sensor calibration and altitude estimation. In different embodiments, the second approach is performed using a processor of a mobile device, a server, and/or another suitable machine.

Figure 7:
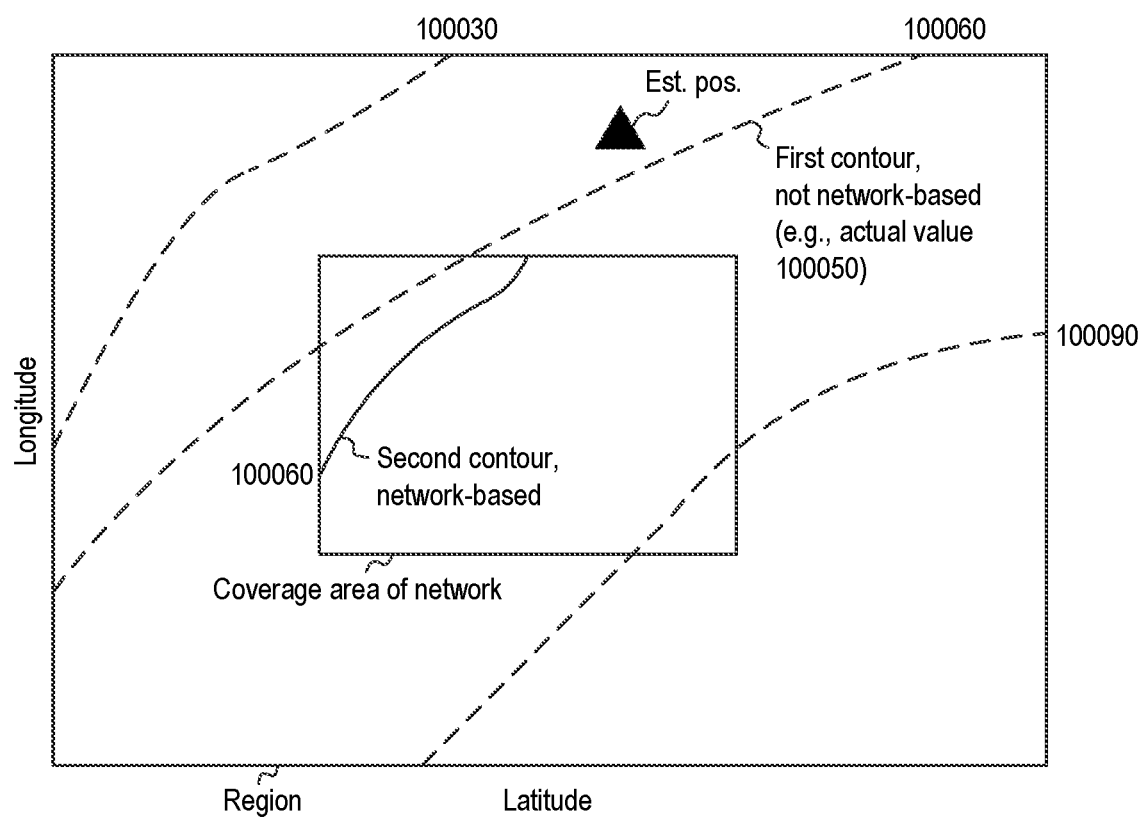
FIG. 7 depicts why using non-network pressure data that is typically less reliable than network pressure data can produce errors in excess of maximum tolerated calibration and altitude errors.

When the mobile device resides outside the coverage area of the network, available pressure contours may have been generated using non-network pressure data (e.g., NOAA pressure data). Since non-network pressure data is typically less reliable than network pressure data, such circumstances can produce calibration and altitude values that have errors in excess of maximum tolerated calibration and altitude errors. An illustration in FIG. 7 depicts why using non-network pressure data that is typically less reliable than network pressure data can produce errors in excess of maximum tolerated calibration and altitude errors. A first contour with an estimated reference-level pressure value of 100060 Pa is based on pressure data from a non-network source, such as a NOAA pressure data grid. The first contour extends throughout the region, through the coverage area of the network, and near the estimated position of the mobile device. A second contour with an estimated reference-level pressure value of 100060 Pa is based on more-reliable pressure data from the network. The second contour is not near the estimated position of the mobile device because it is confined in the coverage area of the network. Although the estimated pressure value of the first contour and the estimated second contour are the same, the locations of the first contour and the second contour inside the coverage area of the network are different. Since the pressure values from the network are more reliable (e.g., more accurate) than pressure values from non-network sources, an assumption can be made that the value of the first contour is inaccurate (e.g., should be less than 100060 Pa, such as 100050 Pa). If the value of the first contour is inaccurate, using that inaccurate value of the first contour could produce poor results during sensor calibration or altitude estimation.

As described further below with reference to FIG. 8, and based on the foregoing assumption that pressure values of pressure contours that were determined using non-network pressure data are inaccurate, the second approach uses pressure data from the network to change the pressure value of a pressure contour that was generated using non-network pressure data. The pressure contour may be selected from a group of contours that pass through the coverage area of the network, where preferential selection is given to a contour from the group that is closest to or next to the estimated position. In general, the second approach (i) determines locations of pressure contours in a region using non-network pressure data that is relevant to areas of the region where a mobile device resides outside the network's coverage area, and (ii) uses pressure data from the network to change the value of a selected pressure contour that passes through the network's coverage area and that meets other criteria (e.g., is next to an estimated position of the mobile device compared to other contours passing through the coverage area that are separated from the estimated position by another contour). In effect, the second method improves upon the use of non-network-based pressure contours for sensor calibration or altitude estimation by updating the pressure value of the non-network-based contours using more-reliable pressure data. As a result, more accurate sensor calibration and altitude estimation is achieved.

Figure 8:
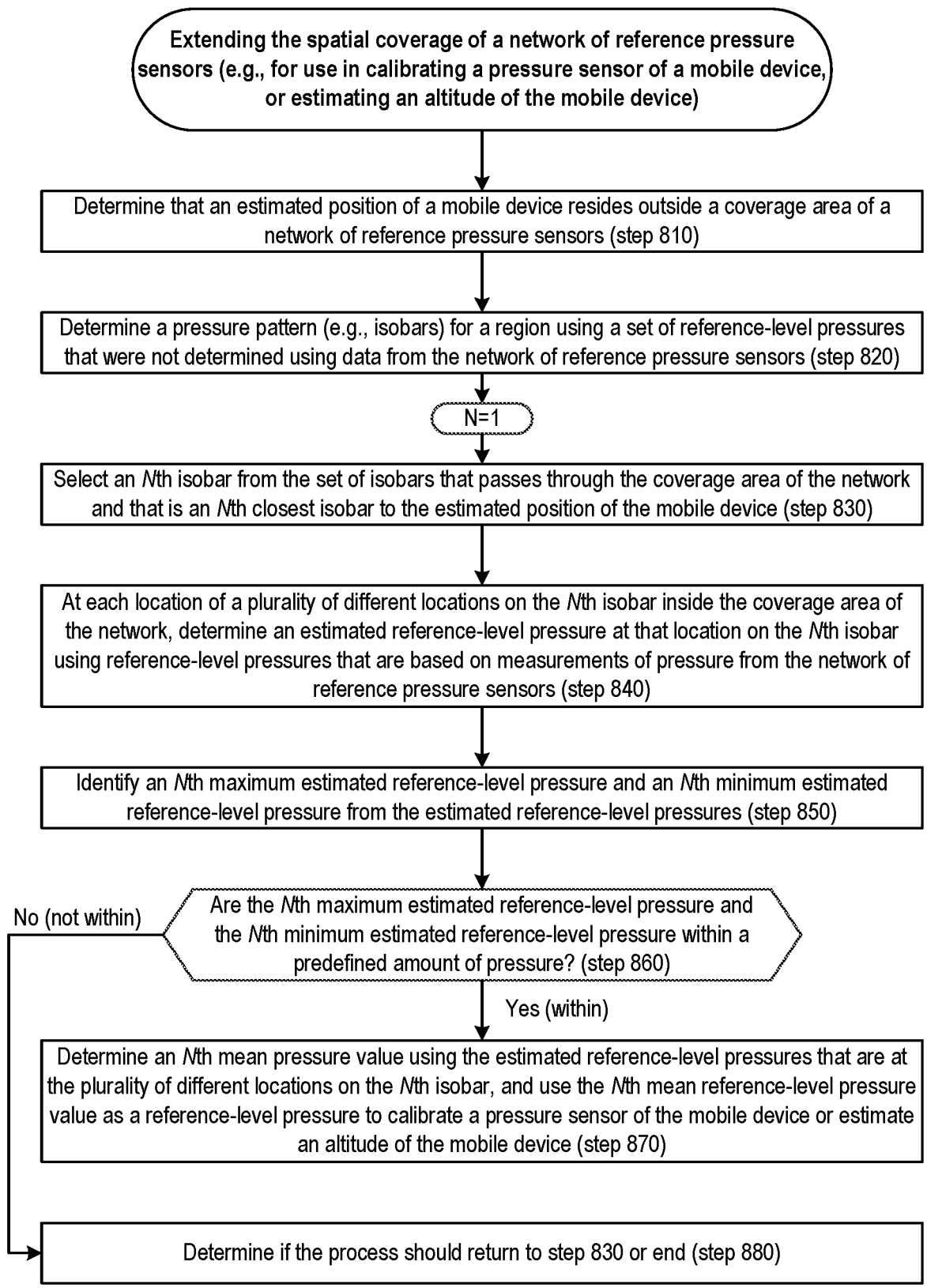
FIG. 8 shows an approach for extending the spatial coverage of a network of reference pressure sensors by updating values of non-network-based pressure contours using pressure values from the network.

One method for extending the spatial coverage of a network of reference pressure sensors by updating values of pressure contours is shown in FIG. 8.

Initially, a determination is made that an estimated position of a mobile device resides outside a coverage area of the network (step 810). In different embodiments, step 810 is performed using a processor of a mobile device, a server, and/or another suitable machine.

A set of isobars (e.g., pressure contours) for a region are determined using a set of reference-level pressures that were determined using measurements of pressure from weather sensors that are not part of the network of reference pressure sensors (step 820). By way of example, the set of reference-level pressures may be a gridded set of reference-level pressures from the NOAA High resolution Rapid Refresh. In one embodiment, each pair of neighboring isobars in the set of isobars are separated by no more than a first threshold amount of pressure (e.g., 2 Pa, 5 Pa, 10 Pa, 30 Pa or other value equal to or less than). The first threshold amount of pressure may have different values—e.g., (i) being equal to an amount of tolerated pressure error associated with a tolerated calibration or altitude error (e.g., 10 Pa or 30 Pa), or (ii) being less than the tolerated pressure error, such as a fraction of the tolerated pressure error. In different embodiments, step 820 is performed using a processor of a mobile device, a server, and/or another suitable machine.

An Nth isobar from the set of isobars that passes through the coverage area of the network and that is an Nth closest isobar to the estimated position of the mobile device is determined (step 830), where the value of N equals 1 for the first iteration of step 830. In different embodiments, step 830 is performed using a processor of a mobile device, a server, and/or another suitable machine.

Figure 9:
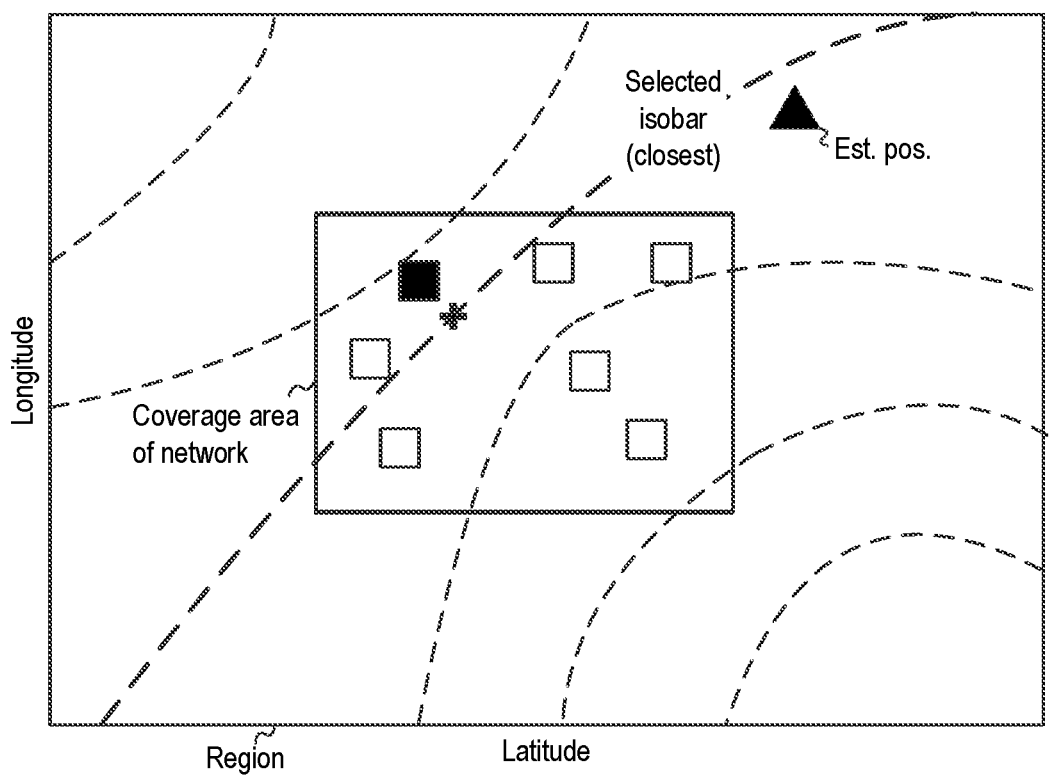
FIG. 9 depicts a reference-level pressure in a pressure pattern that is closest to a selected location on an isobar.
Figure 10:
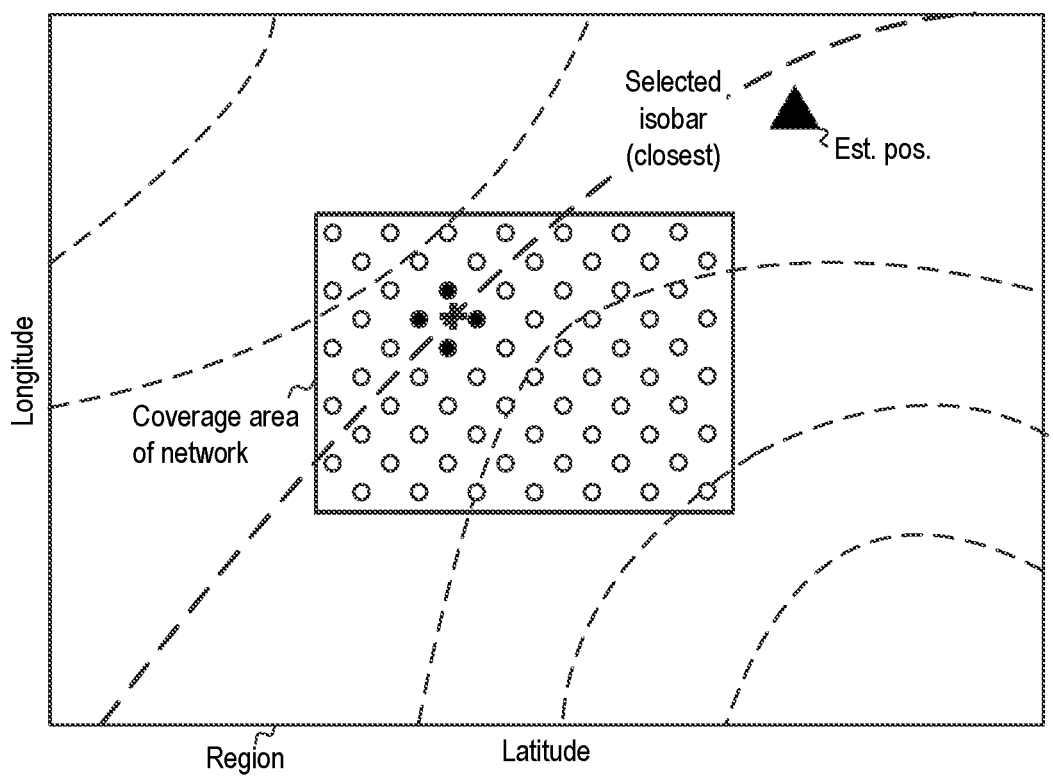
FIG. 10 depicts a combination of reference-level pressures in a pressure pattern with locations that are closest to a selected location on an isobar.

At each location of a plurality of different locations on the Nth isobar inside the coverage area, an estimated reference-level pressure is determined for that location using reference-level pressures that are based on measurements of pressure from the network of reference pressure sensors (step 840). By way of example, the plurality of locations may be every point on the Nth isobar inside the coverage area. Alternatively, the plurality of locations may include only points on the Nth isobar inside the coverage area that are separated by a predefined distance. In one embodiment for step 840, for each location of the plurality of locations, the estimated reference-level pressure is determined at that location by combining (e.g., averaging, interpolating, or other combination) selected values from the reference-level pressures that are based on measurements of pressure from the network of reference pressure sensors (e.g., n reference-level pressures that are closest to the location). By way of example, FIG. 9 depicts selection of n=1 reference-level pressure (e.g., the shaded square) that is closest to a location (e.g., the shaded cross) on a selected isobar. In another embodiment for step 840, where the reference pressure sensors are irregularly spaced in the coverage area, the reference-level pressures that are based on measurements of pressure from the network of reference pressure sensors are used to determine a grid of uniformly-spaced reference-level pressure values in the coverage area (e.g., using a well-known Kriging method or other method to produce a grid of uniformly spaced values based on irregularly spaced measured values), and then, for each location of the plurality of locations, the estimated reference-level pressure at that location is determined by combining (e.g., averaging, interpolating, or other combination) selected values from that grid (e.g., four values from the grid that are closest to the location). By way of example, FIG. 10 depicts a combination of four reference-level pressures (e.g., the shaded circles) with locations that are closest to a location (e.g., the shaded cross) on a selected isobar. In one implementation, the combination is an average of the four reference-level pressures, or a weighted average where each of the four reference-level pressures are weighted based on a distance between a location of that pressure and the location on the isobar (e.g., the highest weight given to the pressure at the shortest distance). In another implementation, the combination is any type of interpolation. In different embodiments, step 840 is performed using a processor of a mobile device, a server, and/or another suitable machine.

An Nth maximum (highest) estimated reference-level pressure and an Nth minimum (lowest) estimated reference-level pressure are identified from the estimated reference-level pressures that are at the plurality of different locations on the Nth isobar (step 850). In different embodiments, step 850 is performed using a processor of a mobile device, a server, and/or another suitable machine.

A determination is made as to whether the Nth maximum estimated reference-level pressure and the Nth minimum estimated reference-level pressure are within a predefined amount of pressure (e.g., 2, Pa, 5 Pa, 10 Pa, 30 Pa, or other value that is equal to or preferably less than the threshold amount of pressure used to separate the isobars) (step 860). In different embodiments, step 860 is performed using a processor of a mobile device, a server, and/or another suitable machine.

If the Nth maximum estimated reference-level pressure and the Nth minimum estimated reference-level pressure are within the predefined amount of pressure, an Nth mean pressure value of the estimated reference-level pressures that are at the plurality of different locations on the Nth isobar is determined, and the Nth mean reference-level pressure value is used as a reference-level pressure to calibrate a pressure sensor of the mobile device or estimate an altitude of the mobile device (step 870). In different embodiments, step 870 is performed using a processor of a mobile device, a server, and/or another suitable machine.

If the Nth maximum estimated reference-level pressure and the Nth minimum estimated reference-level pressure are not within the predefined amount of pressure of each other, a determination is made as to whether the process should return to step 830 or end (step 880). A first embodiment of step 880 when the first threshold amount of pressure is equal to the tolerated pressure error comprises the following step(s): end the process without calibrating the pressure sensor of the mobile device or estimating the altitude of the mobile device using any determined mean reference-level pressure value. A second embodiment of step 880 when the first threshold amount of pressure is less than the tolerated pressure error (e.g., a fraction 1/n of the tolerated pressure error) comprises the following step(s): increment N by 1, determine if the current value of N is greater than the value of n, and return to step 830 if the current value of N is not greater than the value of n, or otherwise end the process without calibrating the pressure sensor of the mobile device or estimating the altitude of the mobile device using any determined mean reference-level pressure value. Alternatively, after arriving at step 880 for N=1, a determination is made as to whether the amount of pressure separating the first isobar and a second isobar is less than or equal to one-half of the tolerated pressure error, and if so, then the process returns to step 830 for N=2. A third embodiment of step 880 when the tolerated pressure error can be exceeded comprises the following step(s): increment N by 1, determine if the current value of N is greater than a number of isobars from the set of isobars that pass through the coverage area, and return to step 830 if the current value of N is not greater than the number of isobars from the set of isobars that pass through the coverage area, or otherwise end the process without calibrating the pressure sensor of the mobile device or estimating the altitude of the mobile device using any determined mean reference-level pressure value. In different embodiments, step 880 is performed using a processor of a mobile device, a server, and/or another suitable machine.

Third Approach for Extending the Spatial Coverage of a Network of Reference Pressure Sensors A third approach for extending the spatial coverage of a network of reference pressure sensors (e.g., for use in calibrating a pressure sensor of a mobile device, or estimating an altitude of the mobile device) translates initial positions of reference-level pressures corresponding to reference pressure sensors of the network to other locations in a region that are possibly outside the coverage area of the network. The initial positions are translated to other locations using wind information that may be accessed from public data (e.g., NOAA HRRR wind fields) or other wind measurements. A spatial average wind speed and direction is computed using information about wind inside the coverage area of the network and/or other areas of the region. The average wind speed can be decomposed into two parts: speed along an east-west direction, and speed along a north-south direction. The magnitudes of distances traveled along east-west and north-south directions are computed by assuming a time interval (e.g., 600 seconds), which may be a function of atmospheric conditions (calm versus disturbed weather), underlying flatness of terrain, air temperature change with distance near a terrestrial surface, or other factors. An east-west distance can be computed as the east-west wind speed*the time interval, and a north south distance can be computed as the north-south wind speed*the time interval. The resultant distances are used to translate each reference-level pressure location inside the coverage area to a new position that may be closer to an estimated position of a mobile device that resides outside the coverage area. If new positions of reference-level pressures are closer to an estimated position of a mobile device, then a predefined number of reference-level pressures with new positions that are closest to the estimate position of the mobile device can be combined (e.g., averaged) where the combined result is used as the reference-level pressure during sensor calibration or altitude estimation.

Figure 11:
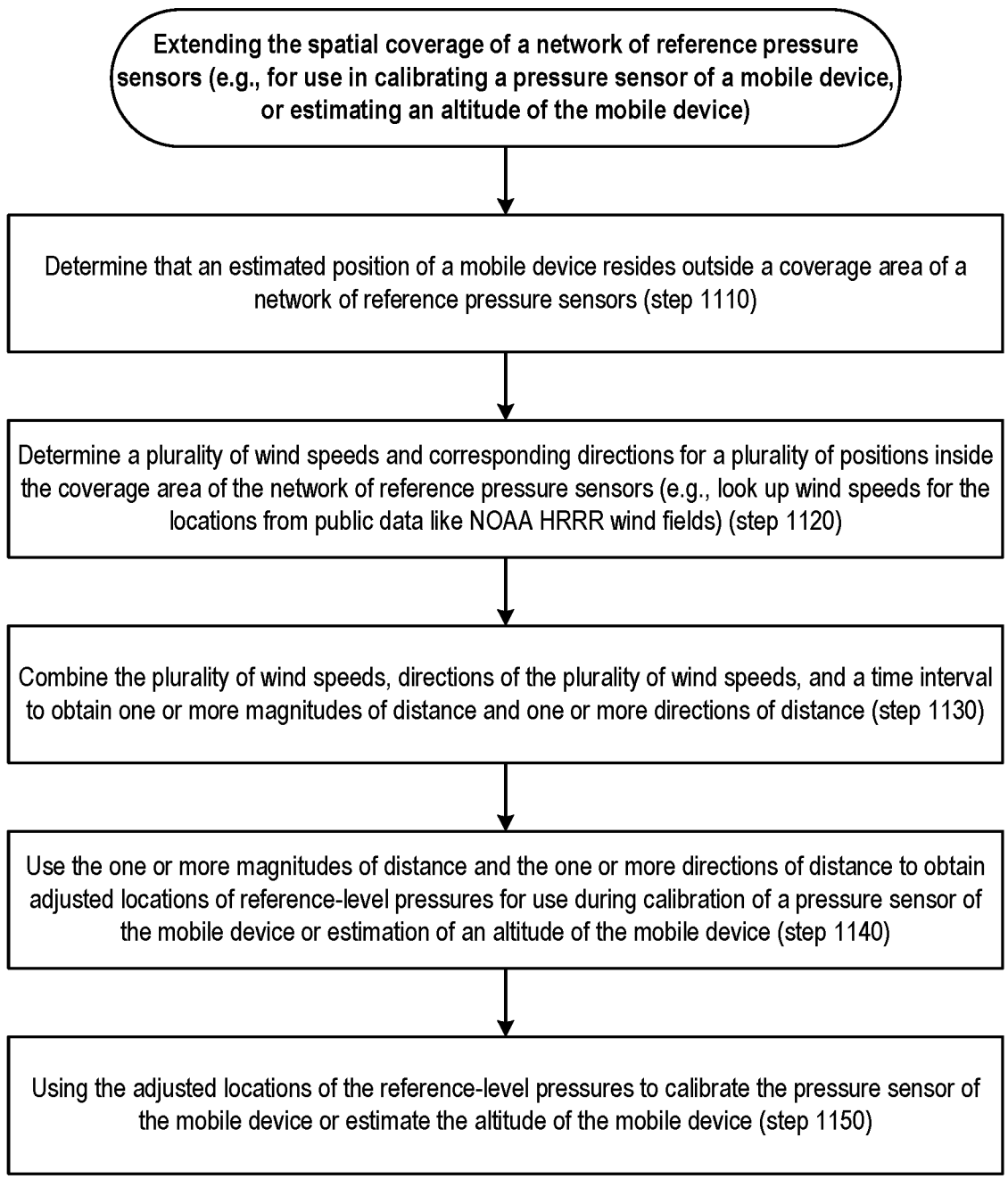
FIG. 11 shows an approach for extending the spatial coverage of a network of reference pressure sensors using wind data.

One method for extending the spatial coverage of a network of reference pressure sensors using wind data is shown in FIG. 11.

Initially, an estimated position of a mobile device is determined to reside outside a coverage area of a network of reference pressure sensors (step 1110). In different embodiments, step 1110 is performed using a processor of a mobile device, a server, and/or another suitable machine.

A plurality of wind speeds and corresponding directions of wind for a plurality of positions inside the coverage area of the network is determined (step 1120). In one embodiment, determination of wind speeds and directions is accomplished by accessing wind speeds and directions for different locations inside the coverage area from public data like NOAA HRRR wind fields. In different embodiments, step 1120 is performed using a processor of a mobile device, a server, and/or another suitable machine.

Figure 12:
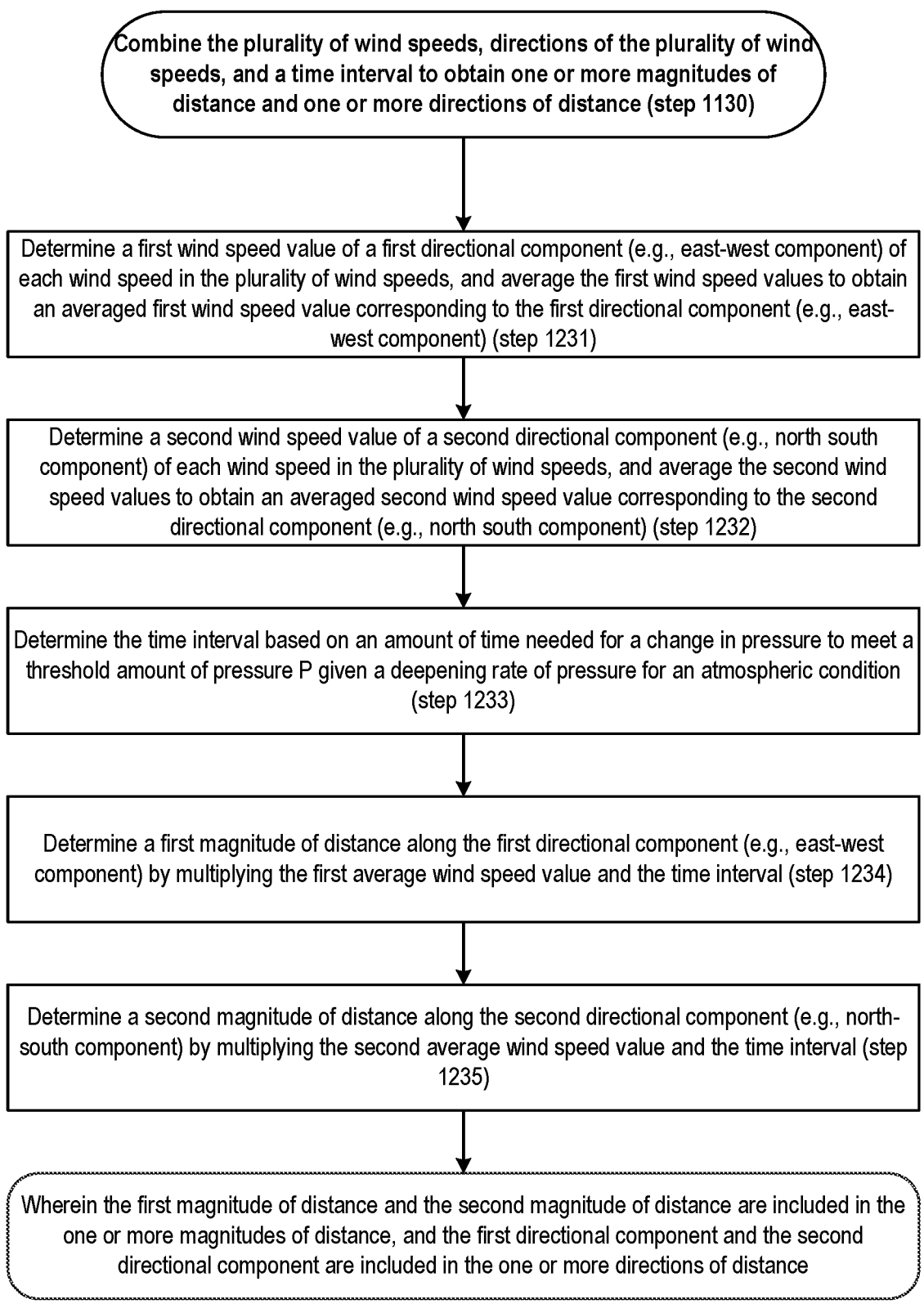
FIG. 12 shows an embodiment for determining one or more magnitudes of distance and one or more directions of distance using wind speed data for a coverage area of a network.

One or more magnitudes of distance and one or more directions of distance are determined using the plurality of wind speeds and directions, and also a time interval (step 1130). One embodiment of step 1130 is shown in FIG. 12, which includes the following steps. For each wind speed and direction, a first wind speed value of a first directional component (e.g., east-west component) is determined, and an averaged first wind speed value corresponding to the first directional component (e.g., east-west component) is obtained by averaging the determined first wind speed values (step 1231). For each wind speed and direction, a second wind speed value of a second directional component (e.g., north-south component) is determined, and an averaged second wind speed value corresponding to the second directional component (e.g., north-south component) is obtained by averaging the determined second wind speed values (step 1232). The time interval is determined based on an amount of time needed for a change in pressure in the coverage area to meet a threshold amount of pressure P, such as 10 Pa, 30 Pa, or other value (step 1233)—e.g., the time interval equals the threshold amount of pressure divided by the change in pressure. For example, given a deepening rate of pressure for an atmospheric condition, such as a rate equal to 1/36 Pascals per second for intense mid-latitude cyclones, 30 Pa/(1 Pa/36 seconds)=30 Pa*36 seconds per Pa=30*36 seconds=1080 seconds*1 minute per 60 seconds=18 minutes. A first magnitude of distance along the first directional component (e.g., east-west component) is determined by multiplying the first average wind speed value and the time interval (step 1234). A second magnitude of distance along the second directional component (e.g., north-south component) is determined by multiplying the second average wind speed value and the time interval (step 1235). In one embodiment, the first magnitude of distance and the second magnitude of distance are included in the one or more magnitudes of distance, and the first directional component (e.g., east-west component) and the second directional component (e.g., north-south component) are included in the one or more directions of distance. In another embodiment, known combination techniques are used to combine the first magnitude of distance and the second magnitude of distance into a single magnitude of distance, and known combination techniques are used to combine the first directional component (e.g., east-west component) and the second directional component (e.g., north-south component) into a single direction of distance. In different embodiments, step 1130 is performed using a processor of a mobile device, a server, and/or another suitable machine.

Figure 13A:
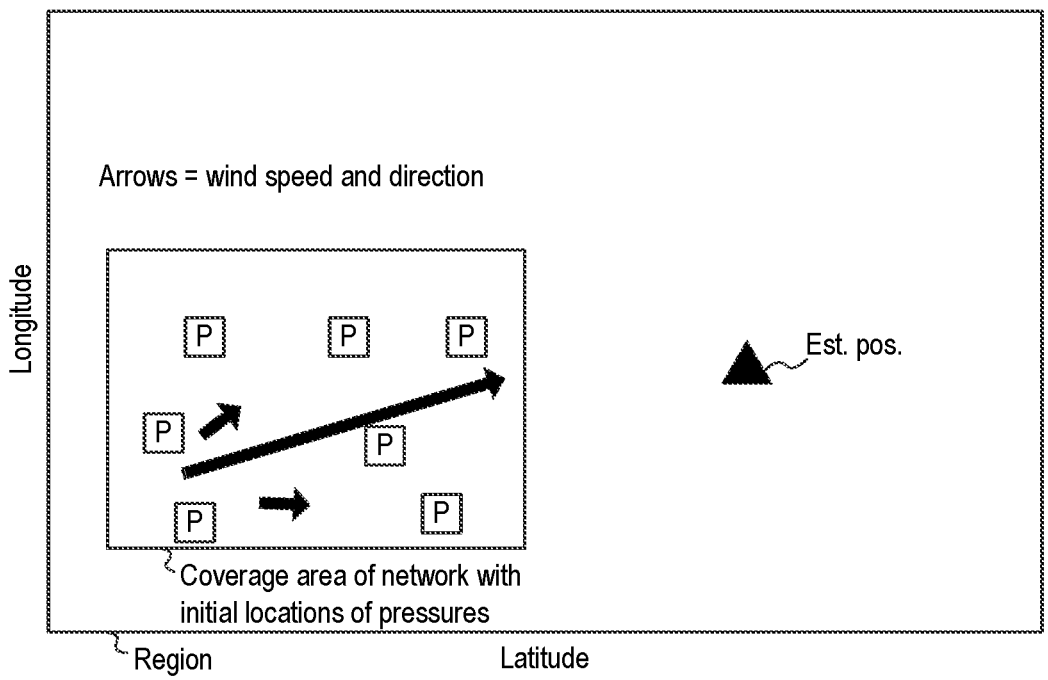
FIG. 13A shows a coverage area of a network with initial locations of reference-level pressures and wind data used to determine a magnitude and direction of distance for adjusting the locations of the reference-level pressures.
Figure 13B:
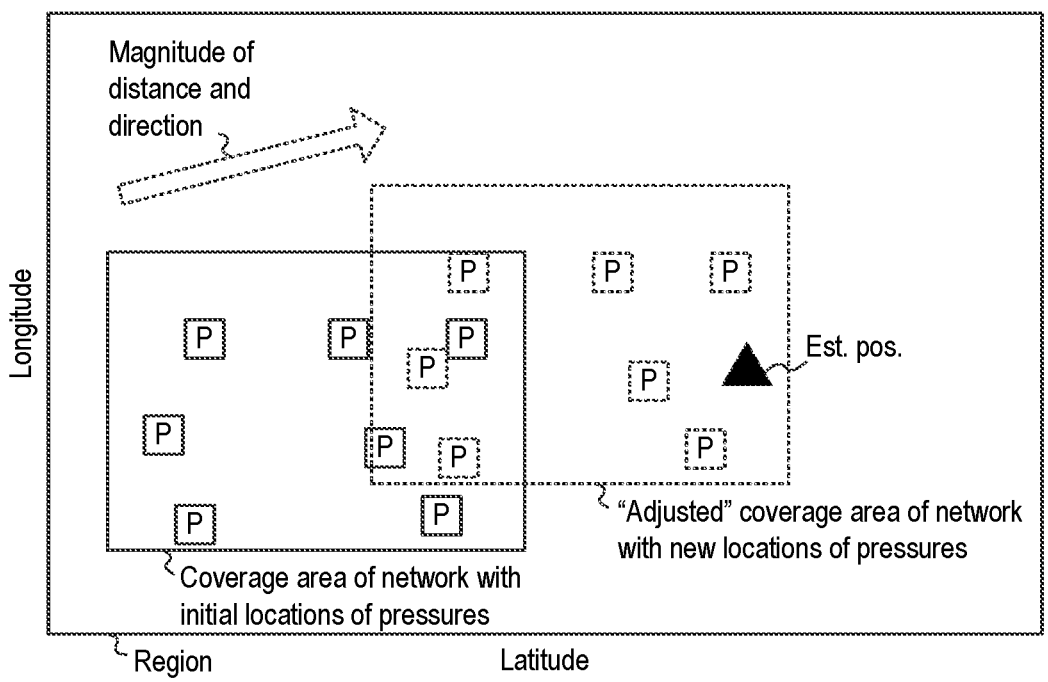
FIG. 13B shows how locations of reference-level pressures from within a coverage area of a network can be adjusted using a magnitude and direction of distance that were determined using wind data of the coverage area.

The one or more magnitudes of distance and the one or more directions of distance are used to obtain adjusted locations of reference-level pressures (step 1140)—e.g., by moving the initial locations of reference-level pressures to new locations that are separated from the initial locations by the one or more magnitudes of distance and the one or more directions of distance. By way of illustration, FIG. 13A shows a coverage area of a network with initial locations of reference-level pressures and wind data (e.g., wind speed and direction) used to determine a magnitude and direction of distance for adjusting the locations of the reference-level pressures, and FIG. 13B shows how the locations of reference-level pressures from within a coverage area can be adjusted using the magnitude and direction of distance that were determined using the wind data. In one embodiment of step 1140, a pressure pattern (e.g., a grid) of reference-level pressures at initial locations are generated using reference-level pressures corresponding to reference pressure sensors of the network, and for each reference-level pressure in the pressure pattern, a new location for that reference-level pressure that is separated by the one or more magnitudes of distance and directions of distance from the initial location of that reference-level pressure is determined. In another embodiment of step 1140, for each reference-level pressure corresponding to each reference pressure sensor of the network, a new location for that reference-level pressure that is the one or more magnitudes of distance and directions of distance away from the initial location of that reference-level pressure is determined. In different embodiments, step 1140 is performed using a processor of a mobile device, a server, and/or another suitable machine.

Finally, one or more new locations of reference-level pressures are identified, and the one or more reference-level pressures of the one or more identified locations are used to calibrate a pressure sensor of the mobile device or estimate an altitude of the mobile device (step 1150). In one embodiment of step 1150, identification of the one or more new locations of reference-level pressures is accomplished by selecting the closest n≥1 new locations to an estimated position of the mobile device as the one or more identified new locations. In another embodiment of step 1150, identification of the one or more new locations of reference-level pressures is accomplished by selecting n≥1 locations from a group of the new locations that are within a predefined maximum distance (e.g., <5 km) from the estimated position as the one or more identified new locations. In yet another embodiment of step 1150, identification of the one or more new locations of reference-level pressures is accomplished by determining a group of the new locations that are within the predefined maximum distance from the estimated position, and selecting n≥1 locations from the group that are closest to an estimated position of the mobile device as the one or more identified new locations. In different embodiments, step 1150 is performed using a processor of a mobile device, a server, and/or another suitable machine.

In one embodiment of the process shown in FIG. 11, an initial step (not shown) includes determining that pressure data from other sources (e.g., the pressure pattern) is not desirable for use in sensor calibration and altitude estimation before the process shown in FIG. 11 is performed. By way of example, undesirable pressure data may include pressure data with an amount of error that exceeds a tolerated amount of error for calibration of mobile device pressure sensors or estimation of mobile device altitudes. By way of another example, undesirable pressure data may lack pressure data that is based on a measurement of pressure that was determined at a location that is within a threshold distance from the estimated position.

Technical Benefits

Mobile devices are routinely used to estimate positions of their users in different environments. Examples of estimated positions include estimated altitudes of mobile devices that are based on (i) reference pressures from a network of reference pressure sensors and (ii) measurements of pressure from pressure sensors of the mobile devices. Unfortunately, limitations in the functionality of the network of reference pressure sensors can impact the accuracy of estimated altitudes, which impairs different uses of the estimated altitudes (e.g., emergency response, navigation, etc.). Such functional limitations of the network of reference pressure sensors include limited coverage area. Processes described herein improve the field of location determination by expanding coverage areas of networks that provide reference-level pressures used to estimate an altitude of a mobile device. Expanded coverage areas enable more accurate, more reliable and/or more available estimated altitudes, which in turn provide for quicker emergency response times or otherwise improve the usefulness of estimated altitudes. In some embodiments, a coverage area of an existing network can be expanded to include a new expansion area without having to install additional equipment into the expansion area, which reduces costs to install and maintain the network, or which makes coverage possible for an expansion area in which installation or maintenance of additional equipment would not be possible. In other embodiments, a desired coverage area can be achieved with a network that uses less equipment compared to the amount of equipment required by other approaches.

Other Aspects

Any method (also referred to as a "process" or an "approach") described or otherwise enabled by disclosure herein may be implemented by hardware components (e.g., machines), software modules (e.g., stored in machine-readable media), or a combination thereof. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media (e.g. one or more non-volatile or volatile storage media, removable or non-removable media, integrated circuit media, magnetic storage media, optical storage media, or any other storage media, including RAM, ROM, and EEPROM) that may be patented under the laws of the jurisdiction in which this application is filed, but does not include machine-readable media that cannot be patented under the laws of the jurisdiction in which this application is filed. Systems that include one or more machines and one or more non-transitory machine-readable media are also contemplated herein. One or more machines that perform or implement, or are configured, operable or adapted to perform or implement operations comprising the steps of any methods described herein are also contemplated herein. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement— e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

Figure 14:
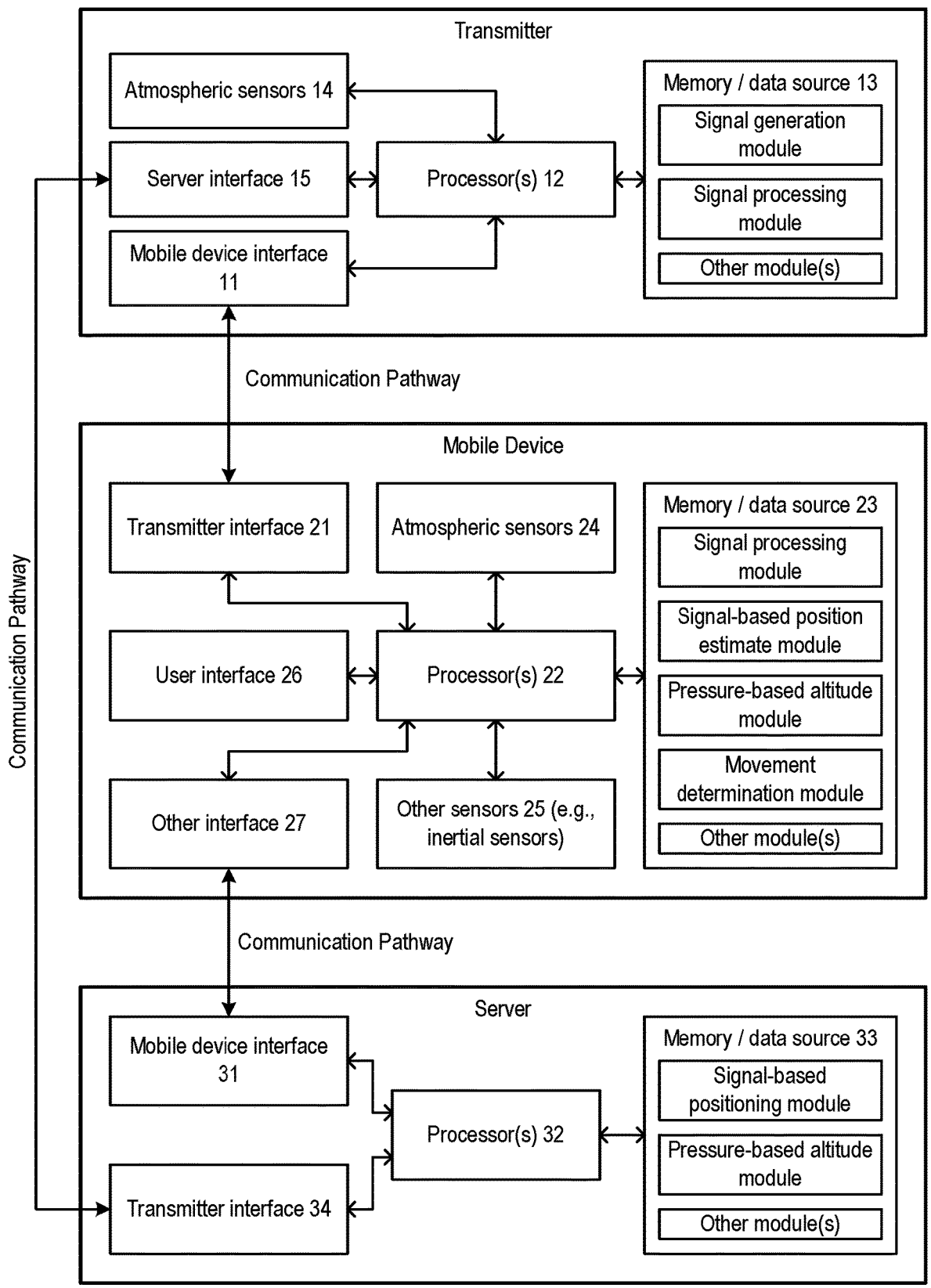
FIG. 14 illustrates components of a transmitter, a mobile device, and a server.

FIG. 14 illustrates components of a transmitter, a mobile device, and a server. Examples of communication pathways are shown by arrows between components.

By way of example in FIG. 14, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

In some embodiments, the atmospheric sensors 14 include a reference pressure sensor. In other embodiments, a stand-alone reference pressure sensor (e.g., a weather station) is substituted for the transmitter, and the stand-alone reference pressure sensor includes: atmospheric sensors (e.g., a pressure sensor for measuring pressures, a temperature sensor for measuring temperatures); memory (e.g., storing instructions for computing reference-level pressures based on the measured pressures); processor(s) for executing instructions stored in the memory; and any suitable interface for communicating pressure data to other things (e.g., the mobile device and/or the server).

By way of example FIG. 14, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 14, the server may include: a mobile device interface 21 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

This application relates to the following related application(s): U.S. Pat. Appl. No. 62/725,730, filed 31 Aug. 2018, entitled SYSTEMS AND METHODS FOR EXTENDING THE SPATIAL COVERAGE OF A REFERENCE PRESSURE NETWORK. The content of each of the related application(s) is hereby incorporated by reference herein in its entirety.

The invention claimed is:

1. A method comprising:
   determining that an estimated position of a mobile device resides outside a coverage area of a network of reference pressure sensors;

for each reference pressure sensor from the network of reference pressure sensors, determine a reference-level pressure for a reference-level altitude using a measurement of pressure from that reference pressure sensor and an altitude of that reference pressure sensor;

using a first set of reference-level pressures that were not determined using the network of reference pressure sensors to determine a pressure pattern for a region that includes the estimated position and an area not included in the coverage area of the network of reference pressure sensors, the pressure pattern including a set of isobars;

using the reference-level pressures determined for the reference pressure sensors of the network of reference pressure sensors and the pressure pattern determined for the region to determine a reference-level pressure value for use in calibrating a pressure sensor of the mobile device or for use in estimating an altitude of the mobile device; and calibrating the pressure sensor of the mobile device or estimating the altitude of the mobile device using the determined reference-level pressure value;

wherein determining the reference-level pressure value for use in calibrating the pressure sensor of the mobile device or for use in estimating an altitude of the mobile device comprises:

selecting a first isobar from the set of isobars that passes through the coverage area of the network of reference pressure sensors and that is the closest isobar to the estimated position of the mobile device;

at each location of a plurality of different locations on the first isobar inside the coverage area of the network of reference pressure sensors, determining an estimated reference-level pressure at that location on the first isobar using reference-level pressures that are generated based on one or more of the reference-level pressures determined for the reference pressure sensors from the network of reference pressure sensors;

identifying a first maximum estimated reference-level pressure and a first minimum estimated reference-level pressure from the estimated reference-level pressures;

determining if the first maximum estimated reference-level pressure and the first minimum estimated reference-level pressure are within a predefined amount of pressure; and if the first maximum estimated reference-level pressure and the first minimum estimated reference-level pressure are within the predefined amount of pressure, determining a first mean reference-level pressure value using the estimated reference-level pressures that are at the plurality of different locations on the first isobar, and using the first mean reference-level pressure value as the reference-level pressure value for use in calibrating the pressure sensor of the mobile device or for use in estimating the altitude of the mobile device.

2. The method of claim 1, wherein if the first maximum estimated reference-level pressure and the first minimum estimated reference-level pressure are not within the predefined amount of pressure:

selecting a second isobar from the set of isobars that passes through the coverage area of the network of reference pressure sensors and that is the second closest isobar to the estimated position of the mobile device;

at each location of a plurality of different locations on the second isobar inside the coverage area of the network of reference pressure sensors, determining an estimated reference-level pressure at that location on the second isobar using reference-level pressures that are generated based on one or more of the reference-level pressures determined for the reference pressure sensors from the network of reference pressure sensors;

identifying a second maximum estimated reference-level pressure and a second minimum estimated reference-level pressure from the estimated reference-level pressures;

determining if the second maximum estimated reference-level pressure and the second minimum estimated reference-level pressure are within the predefined amount of pressure; and if the second maximum estimated reference-level pressure and the second minimum estimated reference-level pressure are within the predefined amount of pressure, determining a second mean reference-level pressure value using the estimated reference-level pressures that are at the plurality of different locations on the second isobar, and using the second mean reference-level pressure value as the reference-level pressure value for use in calibrating the pressure sensor of the mobile device or for use in estimating the altitude of the mobile device.

3. The method of claim 1, wherein if the first maximum estimated reference-level pressure and the first minimum estimated reference-level pressure are not within the predefined amount of pressure:

determining if an amount of pressure separating the first isobar and a second isobar from the set of isobars that passes through the coverage area of the network of reference pressure sensors and that is the second closest isobar to the estimated position of the mobile device exceeds a tolerated pressure error; and only if the amount of pressure separating the first isobar and the second isobar does not exceed the tolerated pressure error:

(a) at each location of a plurality of different locations on the second isobar inside the coverage area of the network of reference pressure sensors, determining an estimated reference-level pressure at that location on the second isobar using reference-level pressures that are generated based on one or more of the reference-level pressures determined for the reference pressure sensors from the network of reference pressure sensors;

(b) identifying a second maximum estimated reference-level pressure and a second minimum estimated reference-level pressure from the estimated reference-level pressures;

(c) determining if the second maximum estimated reference-level pressure and the second minimum estimated reference-level pressure are within the predefined amount of pressure; and (d) if the second maximum estimated reference-level pressure and the second minimum estimated reference-level pressure are within the predefined amount of pressure, determining a second mean pressure value using the estimated reference-level pressures that are at the plurality of different locations on the second isobar, and using the second mean reference-level pressure value as the reference-level pressure value for use in calibrating the pressure sensor of the mobile device or for use in estimating the altitude of the mobile device.

4. The method of claim 1, wherein if the first maximum estimated reference-level pressure and the first minimum estimated reference-level pressure are not within the predefined amount of pressure:
- determining an amount of pressure separating the first isobar and a second isobar from the set of isobars that passes through the coverage area of the network of reference pressure sensors and that is the second closest isobar to the estimated position of the mobile device;
- determining if the amount of pressure is less than or equal to one-half of a tolerated pressure error; and
- only if the amount of pressure is less than or equal to one-half of the tolerated pressure error:
  - (a) at each location of a plurality of different locations on the second isobar inside the coverage area of the network of reference pressure sensors, determining an estimated reference-level pressure at that location on the second isobar using reference-level pressures that are generated based on one or more of the reference-level pressures determined for the reference pressure sensors from the network of reference pressure sensors;
  - (b) identifying a second maximum estimated reference-level pressure and a second minimum estimated reference-level pressure from the estimated reference-level pressures;
  - (c) determining if the second maximum estimated reference-level pressure and the second minimum estimated reference-level pressure are within the predefined amount of pressure; and
  - (d) if the second maximum estimated reference-level pressure and the second minimum estimated reference-level pressure are within the predefined amount of pressure, determining a second mean pressure value using the estimated reference-level pressures that are at the plurality of different locations on the second isobar, and using the second mean reference-level pressure value as the reference-level pressure value for use in calibrating the pressure sensor of the mobile device or for use in estimating the altitude of the mobile device.

5. The method of claim 1, wherein if the first maximum estimated reference-level pressure and the first minimum estimated reference-level pressure are not within the predefined amount of pressure:
- determining if a second isobar from the set of isobars passes through the coverage area of the network of reference pressure sensors; and
- only if the second isobar from the set of isobars passes through the coverage area of the network of reference pressure sensors:
  - (a) at each location of a plurality of different locations on the second isobar inside the coverage area of the network of reference pressure sensors, determining an estimated reference-level pressure at that location on the second isobar using reference-level pressures that are generated based on one or more of the reference-level pressures determined for the reference pressure sensors from the network of reference pressure sensors;
  - (b) identifying a second maximum estimated reference-level pressure and a second minimum estimated reference-level pressure from the estimated reference-level pressures;
  - (c) determining if the second maximum estimated reference-level pressure and the second minimum estimated reference-level pressure are within the predefined amount of pressure; and
  - (d) if the second maximum estimated reference-level pressure and the second minimum estimated reference-level pressure are within the predefined amount of pressure, determining a second mean pressure value using the estimated reference-level pressures that are at the plurality of different locations on the second isobar, and using the second mean reference-level pressure value as the reference-level pressure value for use in calibrating the pressure sensor of the mobile device or for use in estimating the altitude of the mobile device.

6. One or more non-transitory machine-readable media embodying program instructions that, when executed by one or more machines, cause the one or more machines to implement the method of claim 1.

7. A system comprising: a memory comprising computer-executable instructions; and a machine configured to execute the computer-executable instructions and cause the processing system to perform the method of claim 1.

* * * * *